(12) United States Patent
Zhang

(10) Patent No.: US 10,467,057 B2
(45) Date of Patent: Nov. 5, 2019

(54) SELECTING A LOGIC OPERATION UNIT THAT MATCHES A TYPE OF LOGIC OPERATION UNIT REQUIRED BY A SELECTED OPERATION ENGINE

(71) Applicant: Alibaba Group Holding Limited, Georgetown, Grand Cayman (KY)

(72) Inventor: Xiaoyu Zhang, Hangzhou (CN)

(73) Assignee: ALIBABA GROUP HOLDING LIMITED, Georgetown, Grand Cayman (KY)

( * ) Notice: Subject to any disclaimer, the term of this patent is extended or adjusted under 35 U.S.C. 154(b) by 108 days.

(21) Appl. No.: 15/867,128

(22) Filed: Jan. 10, 2018

(65) Prior Publication Data

US 2018/0196699 A1  Jul. 12, 2018

(30) Foreign Application Priority Data

Jan. 10, 2017 (CN) .......................... 2017 1 0016528

(51) Int. Cl.
| G06F 9/46 | (2006.01) |
|---|---|
| G06F 9/50 | (2006.01) |
| H04L 9/30 | (2006.01) |
| G06F 9/48 | (2006.01) |
| G06F 9/54 | (2006.01) |
| H04L 9/08 | (2006.01) |
| G09C 1/00 | (2006.01) |

(52) U.S. Cl.
CPC .......... *G06F 9/5005* (2013.01); *G06F 9/4881* (2013.01); *G06F 9/546* (2013.01); *G09C 1/00* (2013.01); *H04L 9/0816* (2013.01); *H04L 9/30* (2013.01); *H04L 9/302* (2013.01); *H04L 2209/125* (2013.01)

(58) Field of Classification Search
None
See application file for complete search history.

(56) References Cited

U.S. PATENT DOCUMENTS

| 6,611,906 | B1 * | 8/2003 | McAllister | .......... G06F 13/1673 |
| | | | | 710/107 |
| 8,782,295 | B2 * | 7/2014 | Paragaonkar | ......... G06F 3/0613 |
| | | | | 370/394 |
| 2002/0041683 | A1 | 4/2002 | Hopkins et al. | |
| 2003/0163431 | A1 | 8/2003 | Ginter et al. | |
| 2005/0063543 | A1 | 3/2005 | Kayalackakom et al. | |
| 2005/0132186 | A1 | 6/2005 | Khan et al. | |
| 2005/0132226 | A1 | 6/2005 | Wheeler et al. | |
| 2005/0141715 | A1 * | 6/2005 | Sydir | .................... G06F 9/5033 |
| | | | | 380/255 |
| 2007/0053513 | A1 | 3/2007 | Hoffberg | |
| 2007/0055879 | A1 | 3/2007 | Luo et al. | |
| 2007/0083583 | A1 | 4/2007 | Luo et al. | |
| 2008/0069337 | A1 | 3/2008 | Gopal et al. | |

(Continued)

*Primary Examiner* — Wissam Rashid

(57) ABSTRACT

The utilization rate of operation resources in a computing device is improved by assigning specialized types of logic operations to a data processing engine depending on the type of logic operation that the data processing engine requires to execute a data processing request. The data processing engine is selected from a plurality of engines by first identifying an idle engine, next identifying a post-processing engine when no idle engine is available, and then identifying a stand-by engine when no post-processing engine is available.

20 Claims, 16 Drawing Sheets

(56) References Cited

U.S. PATENT DOCUMENTS

| | | |
|---|---|---|
| 2008/0144810 A1 | 6/2008 | Gopal et al. |
| 2008/0144811 A1 | 6/2008 | Gopal et al. |
| 2008/0147768 A1 | 6/2008 | Gopal et al. |
| 2008/0148011 A1 | 6/2008 | Gopal et al. |
| 2008/0148024 A1 | 6/2008 | Wolrich et al. |
| 2008/0183883 A1 | 7/2008 | Mauro et al. |
| 2009/0010424 A1 | 1/2009 | Qi et al. |
| 2009/0282254 A1 | 11/2009 | Wheller et al. |
| 2009/0282261 A1 | 11/2009 | Khan et al. |
| 2009/0282263 A1 | 11/2009 | Khan et al. |
| 2009/0319804 A1 | 12/2009 | Qi et al. |
| 2011/0258423 A1 | 10/2011 | Hoogerbrugge |
| 2013/0155861 A1 | 6/2013 | Bryers et al. |
| 2013/0332707 A1 | 12/2013 | Gueron et al. |
| 2014/0143889 A1 | 5/2014 | Ginter et al. |
| 2014/0189371 A1 | 7/2014 | Fullerton et al. |
| 2014/0282978 A1 | 9/2014 | Lerner et al. |
| 2015/0237021 A1 | 4/2015 | Sovio et al. |
| 2015/0220744 A1 | 8/2015 | Srinivasan et al. |
| 2016/0077882 A1 | 3/2016 | Miyamoto et al. |
| 2016/0350077 A1 | 12/2016 | Peeters et al. |
| 2017/0091488 A1 | 3/2017 | Gopal et al. |

\* cited by examiner

1300

1400

SELECTING A LOGIC OPERATION UNIT THAT MATCHES A TYPE OF LOGIC OPERATION UNIT REQUIRED BY A SELECTED OPERATION ENGINE

CROSS-REFERENCE TO RELATED APPLICATIONS

This application claims priority to Chinese Patent Application No. 201710016528.1, filed on Jan. 10, 2017, which is incorporated herein by reference in its entirety.

BACKGROUND OF THE INVENTION

1. Field of the Invention

The present invention relates to the field of information security, and in particular, to a scheduling method, apparatus, and system for use in data processing.

2. Description of the Related Art

Generally, a lot of operations are involved in data processing, especially in multi-task data processing. During these operations, a large number of CPU resources may be consumed, and thus the performance of the system is affected. To reduce the CPU resources occupied for data processing, a hardware acceleration unit may be configured, and the operations may be carried out outside the CPU.

Using the RSA public key algorithm as an example, the RSA public key algorithm is a very important unsymmetrical signature/encryption algorithm, which is widely applied in the conventional network communications (for example, HTTPS). A large number of operations are involved in the RSA encryption algorithm, and the encryption intensity depends on the length of the key. That is, a longer key is harder to crack. With the rapid development of computer technologies, a longer key needs to be used to enhance the security level of the RSA encryption. However, a longer key may result in a reduction of the RSA decryption speed. Generally, the calculation of the RSA algorithm is done at a server. If the RSA encryption and decryption are implemented by using software, a large number of CPU resources need to be consumed, and thus the performance of the system is severely affected. If the RSA operation with dense operations is independently performed outside the CPU by using the hardware acceleration unit, the CPU is capable of processing more requests from the protocol stacks and the operating system.

Since the hardware acceleration unit generally employs a multi-operation core (engine) to perform operations, the data processing solution based on hardware acceleration needs to solve the problem as how to schedule resources among a plurality of engines and how to improve the utilization rate of the resources. With respect to the above mentioned technical problem, at present no effective solution has been proposed.

SUMMARY OF THE INVENTION

The present invention improves the utilization rate of operation resources in a computing device by assigning specific logic units to a data processing engine as the computing device requires the specific logic units to process a data processing request.

The present invention includes a method of scheduling data processing requests. The method includes reading, by a computing device, a data processing request from a request queue, and identifying, by the computing device, one or more idle operation engines within a plurality of operation engines in response to reading the data processing request. The method also includes selecting, by the computing device, an idle operation engine from the plurality of operation engines as a selected operation engine to process the data processing request when an idle operation engine is identified, and determining, by the computing device, a type of logic operation unit required by the selected operation engine to process the data processing request.

The method further includes identifying, by the computing device, one or more available logic operation units within a plurality of logic operation units that match the type of logic operation unit required by the selected operation engine to process the data processing request. In addition, the method includes selecting, by the computing device, a logic operation unit that matches the type of logic operation unit required by the selected operation engine as a selected logic operation unit when a logic operation unit that matches the type of logic operation unit required by the selected operation engine is identified. Further, the method includes assigning, by the computing device, the selected logic operation unit to the selected operation engine to execute the data processing request.

The present invention also includes a non-transitory computer-readable medium having computer executable instructions for performing a method for scheduling data processing. The method embodied in the medium includes reading a data processing request from a request queue, and identifying one or more idle operation engines within a plurality of operation engines in response to reading the data processing request.

The method embodied in the medium additionally includes selecting an idle operation engine from the plurality of operation engines as a selected operation engine to process the data processing request when an idle operation engine is identified, and determining a type of logic operation unit required by the selected operation engine to process the data processing request.

The method embodied in the medium further includes identifying one or more available logic operation units within a plurality of logic operation units that match the type of logic operation unit required by the selected operation engine to process the data processing request. In addition, the method embodied in the medium includes selecting a logic operation unit that matches the type of logic operation unit required by the selected operation engine as a selected logic operation unit when a logic operation unit that matches the type of logic operation unit required by the selected operation engine is identified. Further, the method embodied in the medium includes assigning the selected logic operation unit to the selected operation engine to execute the data processing request.

The present invention further includes a computing device that includes an operation engine group that has a plurality of operation engines, a logic operation unit pool that has a plurality of types of logic operation units, and a memory that stores a data processing request queue. The computing device also includes a processor coupled to the operation engine group, the logic operation unit pool, and the memory. The processor to read a data processing request from the data processing request queue, and identify one or more idle operation engines within the plurality of operation engines in response to reading the data processing request. The processor to also select an idle operation engine from the plurality of operation engines as a selected operation engine to process the data processing request when an idle operation engine is identified, and determine a type of logic operation unit required by the selected operation engine to process the data processing request.

The processor to further identify one or more available logic operation units within the plurality of types of logic operation units that match the type of logic operation unit required by the selected operation engine to process the data processing request. In addition, the processor to select a logic operation unit that matches the type of logic operation unit required by the selected operation engine as a selected logic operation unit when a logic operation unit that matches the type of logic operation unit required by the selected operation engine is identified. Further, the processor to assign the selected logic operation unit to the selected operation engine to execute the data processing request.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings, which are incorporated herein for further understanding of the present invention and constitute a part of the specification, illustrate several exemplary embodiments of the present invention. The drawings and the description are illustrative of the invention rather than limiting the same. In the drawings.

DETAILED DESCRIPTION OF THE INVENTION

Figure 1:
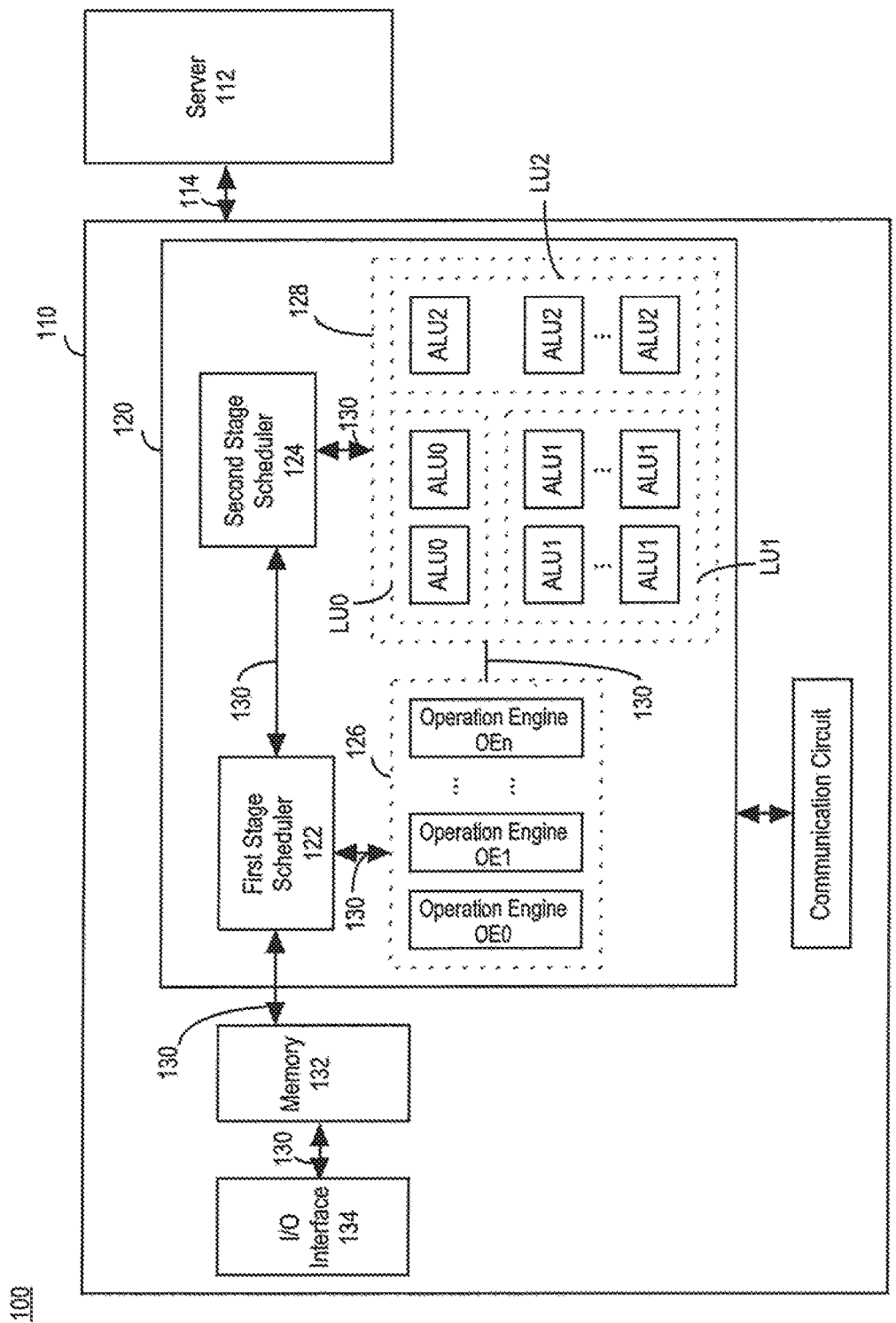
FIG. 1 is a block diagram illustrating an example of a hardware resource scheduling system 100 in accordance with the present invention.

To enable a person skilled in the art to better understand the technical solutions of the embodiments of the present invention, the technical solutions of the present invention are clearly and completely described with reference to the accompanying drawings of the embodiments of the present invention. The described embodiments are only some of the embodiments of the present invention, rather than all of the embodiments. Based on the embodiments of the present invention, all of the other embodiments derived by persons of ordinary skill in the art without any creative efforts shall fall within the protection scope of the present invention.

It should be noted that the terms such as "first," "second," and the like in the specification, claims, and the accompanying drawings of the specification of the present invention are intended for distinguishing objects from similar ones but are not intended to define a specific sequence or a definite time sequence. It should be understood that the numbers used in this scenario may be exchanged in any suitable scenario, such that the embodiments of the present invention described herein may be implemented in other sequences other than those illustrated in the drawings or described herein. In addition, the terms "comprise," "include," "have," and any variations thereof are intended to cover a non-exclusive inclusion. For example, a process, a method, a system, a product, or a device that includes a series of steps or units are not necessarily limited to those clearly listed steps or units, but a process, a method, a system, a product or a device that includes other inherent steps or units not expressly listed.

First, some of the nouns or terms appearing in the process of describing the embodiments of the present invention are introduced as follows:

RSA algorithm: an unsymmetrical password algorithm, wherein "unsymmetrical" means that this algorithm needs a pair of keys such that when one key is used for encryption, the other key is used for decryption.

ALU: algorithm logic unit, which implements a combined logic circuit including a plurality of arithmetic operations and logic operations.

LRU: least recently used algorithm, which is used to select a corresponding operation engine for an operation task.

HTTPS: Hyper Tex Transfer Protocol over Secure Socket Layer, which is socket layer added HTTP, and is a security-oriented HTTP channel and an HTTP secure version.

Operation engine: a core component in a hardware accelerator to perform operation processing. The hardware accelerator generally uses a plurality of operation core components to improve the speed of processing algorithms.

Before further details of various embodiments of the present application are given, the structure of a suitable hardware resource scheduling system to which the principle of the present application is applied is described hereinafter with reference to FIG. 1.

FIG. 1 shows a block diagram that illustrates an example of a hardware resource scheduling system 100 in accordance with the present invention. As shown in FIG. 1, hardware resource scheduling system 100 includes a client device 110 and a server 112 that is coupled to and in communication with client device 110 over a network 114. Client device 110 may be a mobile device, a computing device, a set-top box, a digital television, a tablet device, a mobile Internet device (MID), a desktop computer, or any other device capable of communicating with server 112.

As further shown in FIG. 1, client device 110 includes a scheduling system 120 that improves the resource utilization rate of client device 110, and enhances the processing efficiency of a secure communication session in the system. Scheduling system 120 includes a first-stage scheduler 122 and a second-stage scheduler 124 that is coupled to first-stage scheduler 122.

Scheduling system 120 also includes an operation engine group 126 that is coupled to first-stage scheduler 122, a logic operation unit pool 128 that is coupled to second-stage scheduler 124 and operation engine group 126, and a bus link 130. Operation engine group 126, in turn, includes a number of operation engines OE0-OEn, while logic operation unit pool 128 includes a number of types of logic operation groups LU0-LU2. In some optional embodiments, client device 110 also includes a memory 132 and an input/output interface 134. In addition, client device 110 can be embodied as any type of system-on-chip device having various components and structures.

In the present example, client device 110 initiates a secure communication session with server 112. As shown in FIG. 1, client device 110 can be provided with an operation engine OE to implement a secure communication session with server 112. The operation engine OE is an encryption engine through which such password functions as generating and storing a security key are implemented. The encryption engine may be a security processor or processing circuit of an independent central processing unit.

When client device 110 initiates a secure communication session with server 112, a security verification is carried out between client device 110 and server 112. That is, the session encryption therebetween is carried out by means of exchanging a security key. Hardware resource scheduling system 100, which can be used for data processing, is capable of implementing such password functions as generating a key by using a security engine.

It should be noted herein that according to one embodiment of the present invention, the secure communication session may be a Security Socket Layer (SSL) communication session, but the present invention is not limited to the SSL communication session. Based on a secure communication session, scheduling system 120 is designed to improve the utilization rate of the resources of client device 110, and to enhance the processing efficiency of the secure communication session in the system. For ease of description, the illustrated system structure is only an example of a suitable environment, and is not intended to limit the usage scope or function of the present application. The hardware resource scheduling system shall be understood as not depending on or needing any component or a combination of the components shown in FIG. 1.

According to one embodiment of the present application, first-stage scheduler 122 and second-stage scheduler 124 are packaged in a die to establish a data connection with the operation engine via a control board bus link. According to another embodiment of the present invention, first-stage scheduler 122, second-stage scheduler 124, operation engine group 126 (the plurality of operation engines OE0-OEn), logic operation unit pool 128 (the plurality of logic operation units ALU0, ALU1, and ALU2), and bus link 130 are packaged in a die. According to still another embodiment of the present invention, first-stage scheduler 122, second-stage scheduler 124, operation engine group 126 (the plurality of operation engines OE0-OEn), logic operation unit pool 128 (the plurality of logic operation units ALU0, ALU1, and ALU2), bus link 130, memory 132, and input/output interface 134.

Input/output interface 134 is configured to receive at least one data processing request, and store the received data request into a request queue. The data processing request may be a processing request involving various operations in the process of performing the encryption and the like algorithms. The data processing request is stored by an external device or a central processing unit to the request queue via the input/output interface.

First-stage scheduler 122 is coupled to input/output interface 134 to read at least one data processing request from the request queue, and assign each data processing request to an operation engine OE satisfying a first predetermined condition.

Second-stage scheduler 124 is coupled to first-stage scheduler 122 to receive the data processing request, and perform scheduling in a logic operation unit pool 128 that includes a number of types of logic operation groups LU0-LU2 which, in turn, each include a number of logic operation units (ALU0, ALU1, and ALU2). The scheduling is based on state data of the operation engine OE satisfying the first predetermined condition to obtain at least one logic operation unit ALU satisfying a second predetermined condition, where the at least one logic operation unit ALU satisfying the second predetermined condition is configured to process the data processing request.

After receiving one or a plurality of data processing requests, first-stage scheduler 110 assigns each of the data processing requests to a corresponding operation engine OE based on the operating state of the current operation engine. The data processing request may be one or a plurality of data processing requests for scheduling the hardware resources to perform data processing. In one embodiment, the RSA algorithm is used as an example. The data processing request may be a data processing request for modular exponentiation or multiplication operation in the RSA hardware acceleration solution. The above operation engine may be an adder or a multiplier for the modular exponentiation or multiplication operation.

In what follows the RSA algorithm is used as an example to further illustrate this embodiment. The RSA algorithm is a first algorithm that is used not only in data encryption but also in digital signature. Therefore, the RSA algorithm provides a basic method for encryption and identifying the information on a public network, and is thus extensively applied in intelligent IC cards and network security products. In general, the RSA algorithm generates a pair of RSA keys, wherein one key is a private key and stored by the user, and the other key is a public key disclosed to the public, that can be even registered on a network server. In this way, a sender encrypts a file using the public key and sends the encrypted file to a receiver. The receiver may receive the file and decrypt the file using the private key.

To improve the security level, the RSA key has at least a length of 500 bits. A recommended length of the RSA key is 1024 bits. Because the RSA password algorithm involves a large number of modular exponentiation or multiplication operations, a large number of CPU resources may be consumed when the RSA algorithm is performed by the software. The large consumption of the CPU resources severely affects the speed of encryption and decryption. With the hardware acceleration solution, an RSA process with intensive operations may be carried out independent of the CPU, such that the CPU is capable of processing more requests from the protocol stacks and the operating system.

Due to the complexity of the RSA algorithm, to improve the operation speed of the RSA algorithm, a multi-operation-core (engine) hardware accelerator is generally used as the hardware acceleration solution to perform the RSA operation. In this case, multiple processing requests may be simultaneously read from a request queue including a plurality of data process requests, and the read data processing requests are then processed in parallel.

It should be noted that first-stage scheduler 122 needs to detect in real time the operating states of the operation engines OE in the hardware accelerator, and assign a currently idle operation engine OE to each of the data processing requests. Specifically, when at least one data processing request is read from the request queue, whether an idle operation engine OE exists is first determined. If an idle operation engine OE exists, the idle operation engine OE is first scheduled to process the read data processing request. If an idle operation engine OE does not exist, whether an operation engine OE performing a post-processing exists is further determined. If an operation engine OE performing a post-processing exists, the operation engine OE performing the post-processing is scheduled to process the read data processing request. If an operation engine performing a post-processing does not exist, whether an idle operation engine OE among the operation engines OE in a standby state exists is judged. If an idle operation engine OE in the standby state exists, the idle operation engine OE is scheduled to process the read data processing request. If an idle operation engine OE in the standby state does not exist, the current data processing request is rejected.

In an embodiment, if no idle operation engines OE among the plurality of operation engines OE0-OEn exist, an operation engine OE may be selected from one or a plurality of operation engines OE about to enter the idle state based on the LRU algorithm, and the data processing request is assigned to the selected operation engine OE. Accordingly, the operation engine OE is scheduled based on the state. That is, the corresponding operation engines OE are assigned to the data processing requests by first-stage scheduler 122 according to the current state class of the operation engines OE, such that load balance is ensured.

Accordingly, the operation engine OE is scheduled based on the state. That is, the corresponding operation engines OE are assigned to the data processing requests by first-stage scheduler 122 according to the current state class of the operation engines OE, such that load balance is ensured.

Second-stage scheduler 124 schedules, according to the current operation stages of the operation engines OE0-OEn after first-stage scheduler 122, one or a plurality of logic operation units ALU from a type of logic operation group LU in logic operation unit pool 128 to process the data processing request and perform the corresponding calculation. Logic operation unit pool 128 represents a set including the logic operation groups LU0-LU2.

Still using the RSA algorithm as an example. A logic operation unit ALU may be an algorithm logic unit. Since each operation engine OE needs to request different ALUs from the CPU for scheduling at different operation stages, after the selected operation engine OE performing the current data processing task enters an operating mode, based on different operation stages of the operation engine OE, the corresponding ALU resources are sequentially requested from second-stage scheduler 124 of the RSA hardware accelerator. Second-stage scheduler 124 schedules the corresponding ALU resources in the logic operation unit pool 128. For example, at a pre-calculation stage, an ALU0 resource may be requested, while at a formal calculation stage, an ALU1 or ALU2 resource may be requested.

It should be noted that the ALU is an execution unit of the CPU, and is a core component of all the CPUs. The major function of the ALU is to perform a binary arithmetic operation (for example, add, subtract, multiply, and the like operations). For example, in the RSA hardware acceleration solution, three respective types of ALUs are mainly involved, ALU0, ALU1, and ALU2. ALU0 is configured to perform a pre-processing/post-processing step. ALU1 and ALU2 are configured to perform formal calculation steps. ALU1 is configured to perform squaring and modulus acquisition steps, while ALU2 is configured to perform multiply and modulus acquisition steps. Since ALU0, the ALU1, and the ALU2 have different data bit widths, ALU0, ALU1, and ALU2 are generally not multiplexed. In addition, since the operation time of the same type of ALUs is completely the same each time, whether an idle ALU of this type exists in logic operation unit pool 128 only needs to be judged. If idle ALUs exist, the ALUs may be assigned in a polling manner.

It can be seen from the above that scheduling logic operation units ALUs from the logic operation groups LU0-LU2 is state-free scheduling. That is, the corresponding logic operation unit ALU is selected by second-stage scheduler 124 at different operation stages of each operation engine OE, thereby implementing state-free scheduling. This approach is simple and highly efficient.

In an optional implementation solution, after one or a plurality of data processing requests are read from a request queue, whether an idle operation engine OE exists in an operation queue in the standby state among a plurality of operation engines OE may be directly determined. If at least one idle operation engine OE exists in the operation engine queue, an operation engine OE is selected from the one or the plurality of idle operation engines OE in the operation engine queue based on the LRU algorithm; and the data processing request is assigned to the selected operation engine OE.

In another optional implementation solution, after one or a plurality of data processing requests are read from a request queue, whether an idle operation engine OE exists in a plurality of operation engines is first determined. If a plurality of idle operation engines OE exist in the plurality of operation engines, one or a plurality of operation engines OE are selected from the plurality of idle operation engines OE based on the LRU algorithm, and the one or a plurality of data processing requests are assigned to the one or the plurality of operation engines OE. If idle operation engines OE do not exist in the plurality of operation engines OE, an operation engine OE is selected from one or a plurality of operation engines OE about to enter the idle state based on the LRU algorithm, and the data processing request is assigned to the selected operation engine OE. If operation engines OE about to enter the idle state do not exist in the plurality of operation engines OE, an idle operation engine OE is selected from an operation engine queue, and the data processing request is assigned to that operation engine OE.

According to the above embodiments, in a scenario where neither idle operation engines OE nor operation engines OE performing a post-processing exist in a plurality of operation engines, an idle operation engine OE is selected from an operation engine queue, and the data processing request is assigned to the selected operation engine. This further improves scheduling and utilization rate of the operation engine resources.

It should be noted herein that since the operation time of the same type of ALUs is completely the same each time, whether an idle ALU of this type exists in the ALU pool only needs to be determined. If idle ALUs exist, the ALUs may be assigned in a polling manner. Therefore, the basic scheduling function of the second-stage scheduler is implemented by a ring-shaped shifter in one-hot encoding and a logic operation of an idle mark, and resources are allocated by means of request control.

In the above embodiment, when the operation engine OE completes the algorithm iteration step and outputs a result, the resource once occupied by the operation engine OE is released. In first-stage scheduler 122, the state of the operation engine OE is updated, a waiting queue and an LRU entry are refreshed, and then the process waits for a next RSA calculation request.

Figure 2:
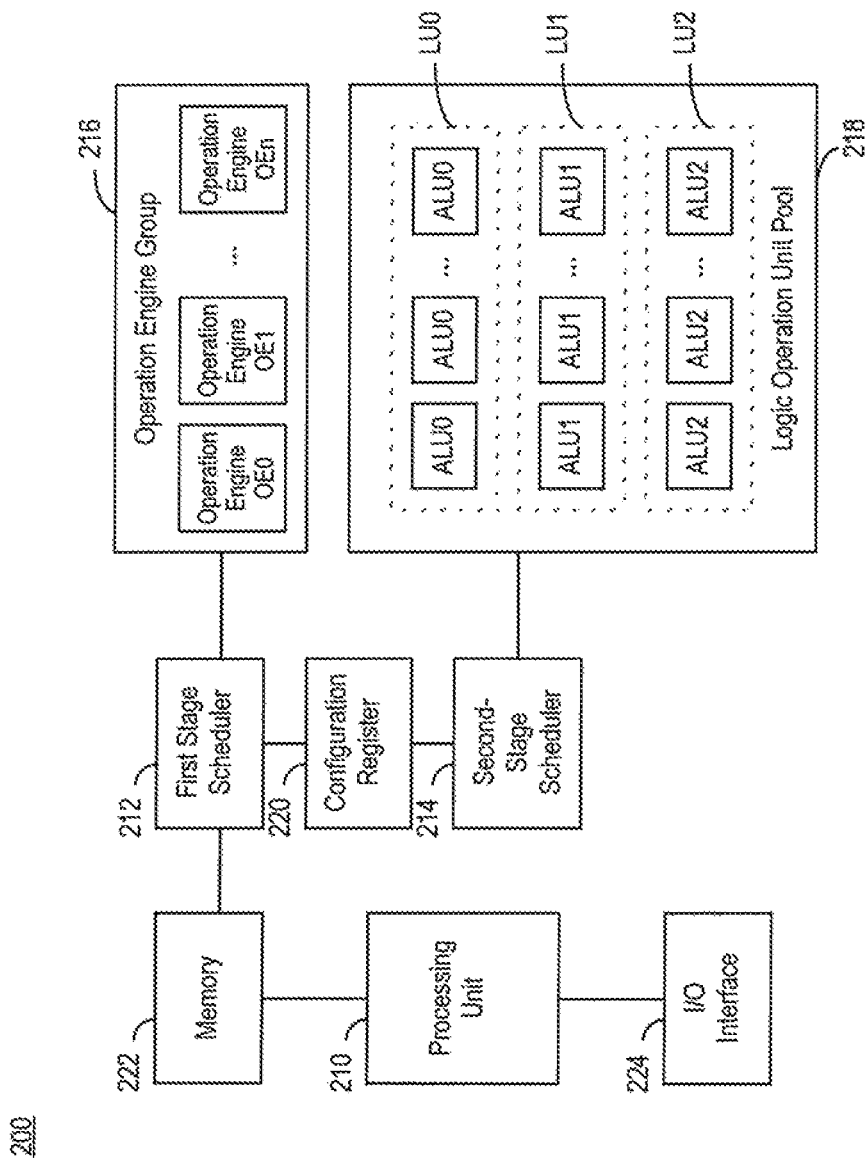
FIG. 2 is a block diagram illustrating an example of a hardware resource scheduling system 200 in accordance with an alternate embodiment of the present invention.

FIG. 2 is a block diagram that illustrates an example of a hardware resource scheduling system 200 in accordance with an alternate embodiment of the present invention. As illustrated in FIG. 2, system 200 includes a processing unit 210, a first-stage scheduler 212, a second-stage scheduler 214, an operation engine group 216, a logic operation unit pool 218, a configuration register 220, a memory 222, and an input and output interface 224.

Processing unit 210 is configured to receive one or a plurality of encryption/decryption requests via the input and output interface 224, and store one or a plurality of data processing requests-encryption/decryption requests to memory 222. First-stage scheduler 212 is configured to, upon reading at least one data processing request from the request queue, schedule an operation engine OE satisfying a predetermined operating state from operation engine group 216 for each data processing request, and the data processing request is assigned to the corresponding operation engine OE. After the operation engine OE enters the operating mode, a corresponding logic operation unit ALU is scheduled from logic operation unit pool 218 according to the current operation stage of the operation engine OE to process the data processing request.

In conclusion, by using the hardware resource scheduling solution employing the first-stage scheduler and the second-stage scheduler, state-based scheduling is performed for the operation engine of the hardware accelerator by using the first-stage scheduling, and state-free scheduling is performed for the logic operation units by using the second-stage scheduling. Both the hardware implementation complexity of the scheduling algorithm and scheduling effect are taken into consideration in this scheduling solution. Decoupling is achieved among the engines and the logic operation units, such that the utilization rate of the resource is improved. The conventional RSA hardware acceleration solution, on the other hand, does not implement resource scheduling and allocation of the logic operation units among the operation engines, and thus the utilization rate of the resources is low.

It should be noted that the hardware resource scheduling system according to the present application may be extensively applied in the field of hardware acceleration. For example, the hardware resource scheduling system may be applied to the hardware acceleration solution employing the RSA public key algorithm in intelligent cards, IC cards, electronic keys, and USB keys. Compared with the traditional software encryption, the hardware encryption has the following main features: first, good stability and compatibility with high encryption speed; and second, strongly-secured with high resistance to decryption attacks. The hardware encryption is therefore more likely to avoid problems like key leakage, memory scanning, and the like in software practice.

An embodiment of the present invention further provides a scheduling method for use in data processing. It should be noted that the steps illustrated in the flow charts in the accompanying drawings may be performed in, for example, a computer system storing a group of computer-executable instructions. Although a logic sequence is given in the flow charts, under some circumstances, the illustrated or described steps may also be performed in a sequence that is different from the sequence given herein.

The scheduling method according to the embodiment of the present invention may be extensively applied in the field of hardware acceleration, such as the hardware acceleration solution employing the RSA public key algorithm in intelligent cards, IC cards, electronic keys, and USB keys. Compared with the traditional software encryption, the hardware encryption has the following main features: first, good stability and compatibility with high encryption speed; and second, strongly-secured with high resistance to decryption attacks. The hardware encryption is therefore more likely to avoid problems like key leakage, memory scanning, and the like in software practice.

More and more extensive application of intelligent cards, IC cards, electronic keys, USB keys, and the like are seen in e-commerce, identity authentication, and the like fields. These devices, having both the data encryption and data storage function, have the following advantages: small in size, convenient in use, robust functions, strongly-secured, low in price, etc. Therefore, these small-sized devices greatly promote the advancement of e-commerce. In addition, these devices are also widely used in other fields such as transportation, healthcare, and identity authentication, greatly improving people's daily life and work in the much modernized world. These small-sized hardware devices such as intelligent cards, IC cards, electronic keys, USB keys and the like are used to implement not only data encryption and transmission, but also digital signature, key exchange, and the like functions. However, users are imposing higher and higher requirements on the security thereof. These hardware devices are required to implement not only symmetrical password algorithms but also RSA unsymmetrical password algorithms. As compared with the symmetrical password algorithms, the RSA encryption algorithm has an even greater calculation workload.

The RSA algorithm is a first algorithm that is not only used in data encryption but also in digital signature. Therefore, the RSA algorithm provides a basic method for encryption and identifying the information on a public network, and is thus extensively applied in intelligent IC cards and network security products. In general, the RSA algorithm generates a pair of RSA keys: one key is a private key and stored by the user, and the other key is a public key disclosed to the public that can even be registered on a network server. In this way, a sender encrypts a file using the public key and sends the encrypted file to a receiver; and the receiver may receive the file and decrypt the file using the private key. To improve the security level, the RSA key has at least a length of 500 bits. A recommended length of the RSA key is 1024 bits. Because the RSA password algorithm involves a large number of operations, a large number of CPU resources may be consumed if the RSA algorithm is performed by the software. Such a consumption severely affects the speed of encryption and decryption. With the hardware acceleration solution, an RSA process with intensive operations may be carried out independent of the CPU, such that the CPU is capable of processing more requests from the protocol stacks and the operating system.

Due to the complexity of the RSA algorithm, the hardware acceleration unit generally employs a multi-operation core (engine) solution to process the operation. Each operation engine needs to request different ALUs from the CPU for scheduling at different operation stages. The ALU is an executing unit of the CPU, and is a core component of all the CPUs. The main function of the ALU is to perform binary arithmetic operations (for example, add, subtract, and multiply operations). However, the conventional RSA hardware acceleration solution does not implement resource scheduling and allocation among the operation engines, and thus the utilization rate of the resources is low.

In the embodiment of the present application, the RSA engine state control is decoupled from the ALU pool, two-stage scheduling solution is employed, the corresponding operation engine is assigned to the current data processing request by means of the first-stage scheduling, and the corresponding ALU resources are requested by means of the second-stage scheduling according to different operation needs for each RSA engine at different operation stages (pre-calculation, formal calculation, and post-processing and the like). The second-stage scheduler selects an ALU of a corresponding type from an ALU pool and assigns the selected ALU to the corresponding RSA engine.

Figure 3A:
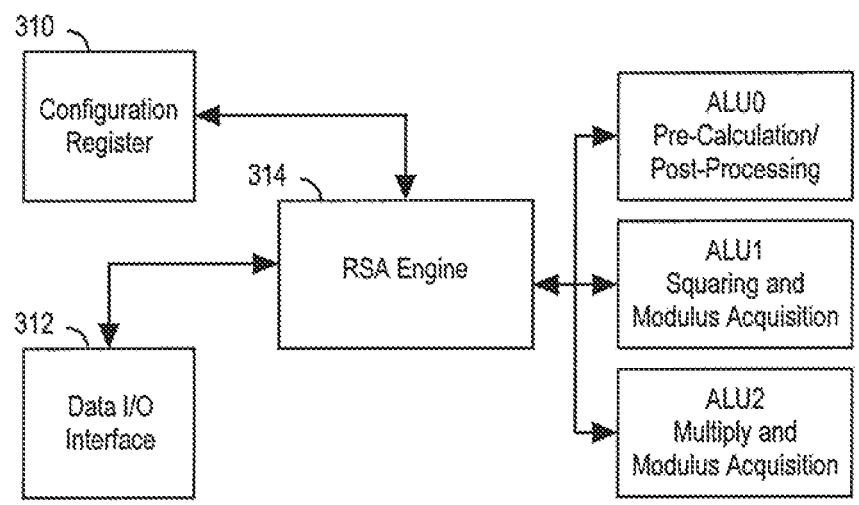
FIG. 3(a) is a block diagram illustrating an example of a single-engine RSA hardware accelerator 300 in accordance with an embodiment of the present invention.

Using the RSA algorithm as an example. FIG. 3(a) shows a block diagram that illustrates an example of a single-engine RSA hardware accelerator 300 in accordance with an embodiment of the present invention. As illustrated in FIG. 3(a), RSA hardware accelerator 300 includes a configuration register 310, a data I/O interface 312, an RSA engine 314, and three respective types of ALUs: ALU0, ALU1, and ALU2. ALU0 is configured to perform pre-processing/post-processing steps, while ALU1 and ALU2 are configured to perform formal calculation steps. ALU1 is configured to perform squaring and modulus acquisition steps, and ALU2 is configured to perform multiply and modulus acquisition steps. Since ALU0, ALU1, and ALU2 have different data bit widths, ALU0, ALU1, and ALU2 are generally not multiplexed. The squaring and modulus acquisition steps of ALU1 may also be replaced by the multiply and modulus acquisition steps of ALU 2. However, ALU 1 is dedicated, optimized, and designed to perform the squaring and modulus acquisition steps. As a result, the power consumption and speed are better than those of ALU2.

Figure 3B:
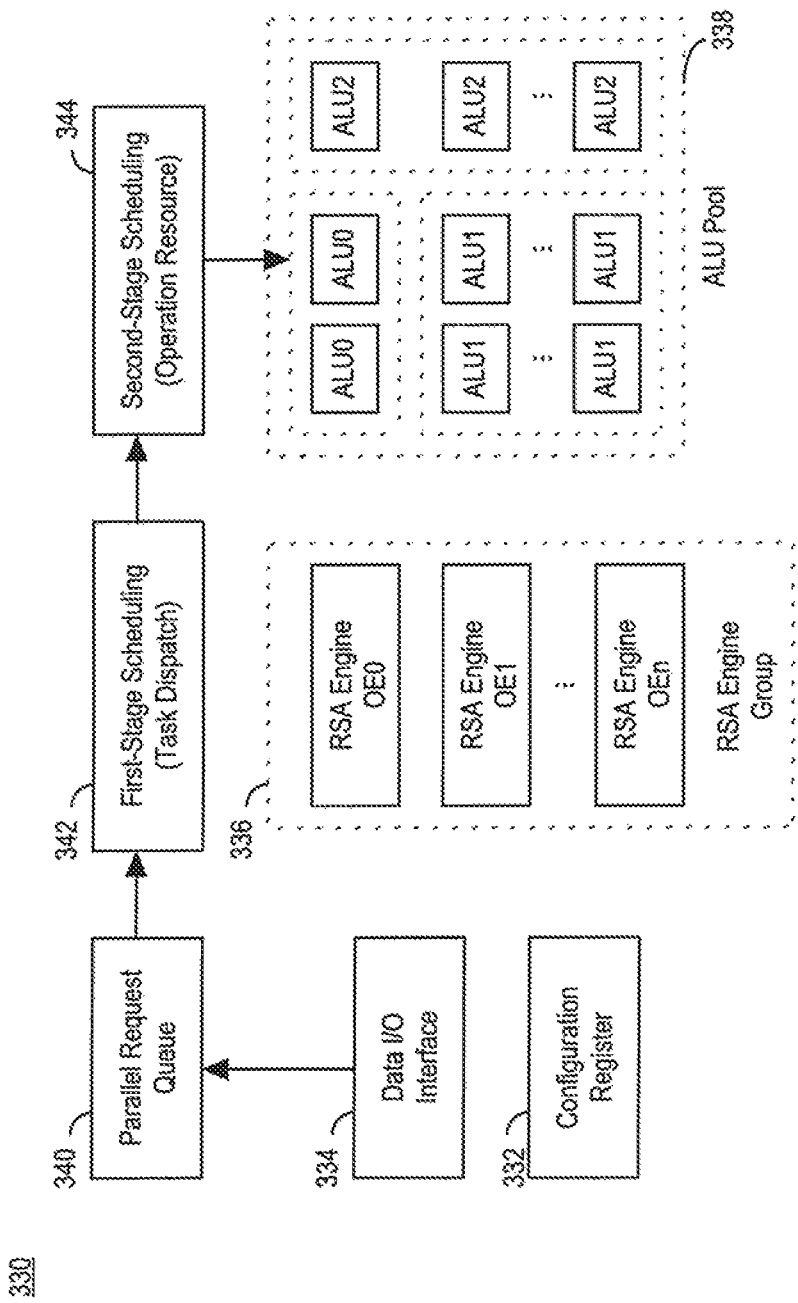
FIG. 3(b) is a block diagram illustrating an example of a multi-engine RSA hardware accelerator 330 in accordance with an embodiment of the present invention.
Figure 3C:
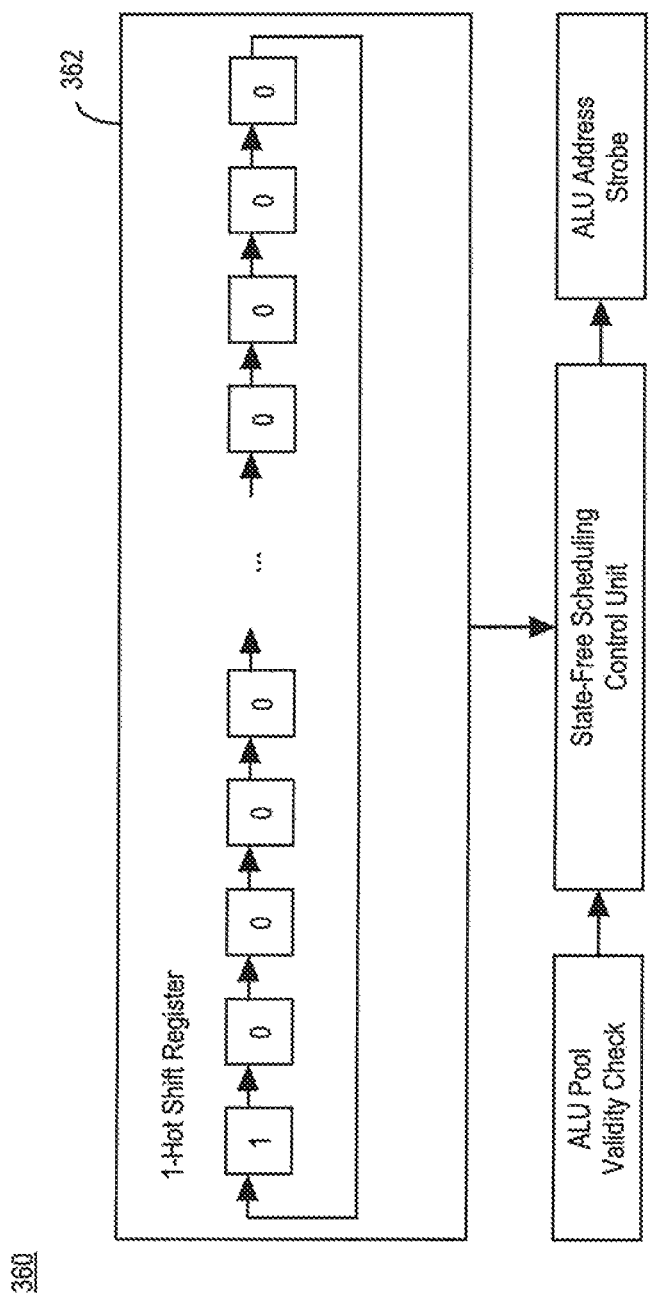
FIG. 3(c) is a block diagram illustrating an example of a second-stage scheduler 360 in accordance with an embodiment of the present invention.

FIG. 3(b) shows a block diagram that illustrates an example of a multi-engine RSA hardware accelerator 330 in accordance with an embodiment of the present invention. As illustrated in FIG. 3(b), RSA hardware accelerator 330 includes a configuration register 332, a data I/O interface 334, an RSA operation engine group 336, and a logic operation unit pool 338 which, in turn, includes three respective types of ALUs: ALU0, ALU1, and ALU2. It can be seen from FIG. 3(b) that RSA operation engine group 336 includes n RSA operation engines OE0-OEn. RSA hardware accelerator 330 further includes a parallel request queue 340, a first-stage scheduler 342, a second-stage scheduler 344. Parallel requests are placed in parallel request queue 340. First-stage scheduler 342 may assign each data processing request to a corresponding RSA operation engine OE according to the data processing tasks in the current parallel request queue 340. After the selected operation engine OE performing the current task enters the operating mode, the corresponding ALU resources are sequentially requested from second-stage scheduler 342 according to different operation stages of the operation engine OE. Second-stage-scheduler 342 schedules the corresponding ALU resources from logic operation unit pool 338. For example, at a pre-calculation stage, an ALU0 resource may be requested, and at a formal calculation stage, an ALU1 or ALU2 resource may be requested. It should be noted herein that since the operation time of the same type of ALUs is completely the same each time, what needs to be determined is merely whether an idle ALU of this type exists in logic operation unit pool 338. If idle ALUs exist, the ALUs may be assigned in a polling manner. FIG. 3(c) shows a block diagram that illustrates an example of a second-stage scheduler 360 in accordance with an embodiment of the present invention. Second stage scheduler 360, which can be used to implement second-stage scheduler 344, assigns resources in an ALU pool. As illustrated in FIG. 3(c), the basic scheduling function of second-stage scheduler 360 is implemented by a ring-shaped shifter 362 in one-hot encoding and a logic operation of an idle mark, and resources are allocated by means of request control.

Figure 4:
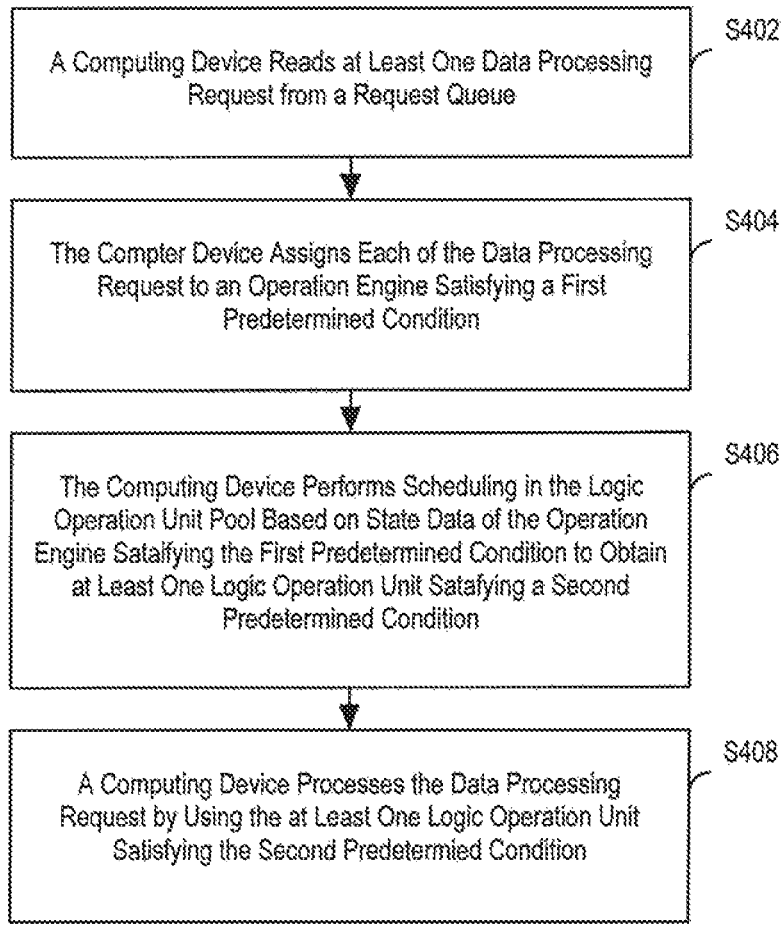
FIG. 4 is a flow chart illustrating an example of a method 400 of scheduling data processing in accordance with the present invention.

In the above running environment, the present invention provides a scheduling method for use in data processing as illustrated in FIG. 4. FIG. 4 is a flow chart illustrating an example of a method 400 of scheduling data processing in accordance with the present invention. Scheduling method 400 includes the following steps that may be all performed in a computing device, wherein the computing device may include a plurality of operation engines and a plurality of logic operation units.

Step S402: A computing device reads at least one data processing request from a request queue.

Specifically, in the above step, the at least one data processing request may be one or a plurality of requests for processing data by scheduling the hardware resource. In an embodiment, the data processing request may be a data processing request for implementing the RSA public key decryption algorithm by using the hardware acceleration method. The request queue is a task queue including one or a plurality of data processing requests. Based on the solution disclosed in step S402, the first-stage scheduling module of the computing device reads one or a plurality of data processing requests from the task queue. If the data processing requests are processed in a serial manner, the data processing requests may be sequentially read from the request queue. If the data processing requests are processed in a parallel manner, a plurality of data processing requests may be simultaneously read each time from the request queue. For example, using the RSA algorithm as an example, a multi-operation core (that is, a plurality of operation engines) hardware accelerator may be employed to improve the operation speed of the RSA algorithm. In this case, a plurality of data processing requests may be read from the request queue, and then processed in the parallel manner.

Step S404: The computing device assigns each data processing request to an operation engine satisfying a first predetermined condition.

Specifically, in the above step, the first predetermined condition may be a predetermined condition in which the operation engine is capable of processing the data processing request. Since each data processing request needs to be processed by using a corresponding operation engine, if a plurality of data processing requests are processed in parallel, the first-stage scheduler may simultaneously read the plurality of data processing requests from the request queue, search for operation engines that are currently in the idle state, and assign each data processing request to a corresponding operation engine. For example, in a scenario where the RSA algorithm is accelerated by using a hardware accelerator employing multiple engines, after the plurality of data processing requests are read from the request queue in parallel, the plurality of read data processing requests may be assigned to the corresponding operation engines.

In a first implementation solution, the first predetermined condition may be that the operation engine is currently in the idle state. If the operation engine is in the idle state, the operation engine may be configured to process the data processing request.

In a second implementation solution, the first predetermined condition may also be that the operation engine is currently performing a post-processing (that is, the operation engine is entering the idle state). If the operation engine is performing a post-processing, the operation engine may be configured to process the data processing request.

In a third implementation solution, the first predetermined condition may also be that the operation engine that is in the standby state enters the idle state. If the operation engine that is in the standby state enters the idle state, the operation engine may be configured to process the data processing request.

It should be noted herein that in an embodiment, the above three implementation solutions may be sequentially executed. Specifically, when at least one data processing request is read from the request queue, whether an idle operation engine exists is first determined. If an idle operation engine exists, the idle operation engine is first scheduled to process the read data processing request. If an idle operation engine does not exist, whether an operation engine performing a post-processing exists is further determined. If an operation engine performing a post-processing exists, the operation engine performing post-processing is scheduled to process the read data processing request. If no operation engine performing a post-processing exists, whether an idle operation engine exists among a plurality of operation engines in the standby state is determined. If an idle operation engine exists among a plurality of operation engines in the standby state, the idle operation engine is scheduled to process the read data processing request. If no idle operation engines exist among a plurality of operation engines in the standby state, the current data processing request is rejected.

Step S406: The computing device performs scheduling in the logic operation unit pool based on state data of the operation engine satisfying the first predetermined condition to obtain at least one logic operation unit satisfying a second predetermined condition.

Specifically, in the above step, the logic operation units may be operation units involved in the process when the operation engine processes the data processing request. In an embodiment, the RSA algorithm is used as an example. The logic operation units may be ALUs. The second predetermined condition may be that types of the logic operation units requested by the operation engine at different operation stages in processing the data process request are met. With respect to a data processing request, after an operation engine satisfying the first predetermined condition is selected, the operation engine may schedule a logic operation unit resource requested at the current operation stage from the logic operation unit pool to obtain one or a plurality of logic operation units satisfying the second predetermined condition.

It should be noted herein that the logic operation unit pool represents a set including a plurality of logic operation units.

Step S408: The computing device processes the data processing request by using the at least one logic operation unit satisfying the second predetermined condition.

Specifically, in the above step, with respect to the read data processing request, after the corresponding one or a plurality of logic operation units are scheduled by the selected operation engine satisfying the first predetermined condition from the logic operation unit pool, the operation engine may process the data processing request by using the scheduled one or the plurality of logic operation units.

It should be noted that in the prior art, the first-stage scheduling solution is employed. The logically complicated first-stage scheduling and the logically simple second-stage scheduling solution in the operation process are not differentiated, and the dynamic adjustment is not carried out for a plurality of parallel operation tasks. Therefore, the utilization rate of the resources is not high. However, the solution disclosed from step S402 to step S408 employs two-stage scheduling solution. In step S404, the data processing request is assigned to the operation engine satisfying the first predetermined condition. The first-stage scheduling is employed, state-based scheduling is implemented, and load balance is ensured by means of determining the current state (that is, the first predetermined condition) of each operation engine, and sending the data processing requests to the corresponding operation engines according to the state data of the operation engines. In step S404, the operation engine performs scheduling in the logic operation unit pool to obtain at least one logic operation unit satisfying the second predetermined condition by using the second-stage scheduling solution. That is, the corresponding logic operation units are selected according to different operation stages of the operation engines to implement state-free scheduling. In this case, the process is simple and highly efficient.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, the RSA algorithm is used as an example. Each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine, a reject response is made. The second-stage scheduling requests corresponding ALU resources according to different operation needs for each RSA engine at different operation stages (pre-calculation, formal calculation, and post-processing and the like). The second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, the above embodiment of the present invention may solve the technical problem that the utilization rate of operation resources in the computing device is low.

In an embodiment, the first predetermined condition at least includes one of the following conditions: whether the operation engine is idle, is performing a post-processing, or is in a standby state, wherein if the first predetermined condition includes a plurality of conditions, judgment is sequentially made to the operation engine according to a priority sequence of the conditions.

Specifically, in the above embodiment, the idle operation engine refers to an idle operation engine that may be used to perform a current request task. The operation engine performing a post-processing refers to an operation engine that is entering the idle state. The operation engine in the standby state refers to an operation engine that is currently in the operation engine waiting queue. Any one or more of the above three operation engines may be selected as an operation engine to perform the current request task. In an embodiment, a currently idle operation engine may be preferentially selected. If there are no currently idle operation engines, an operation engine performing a post-processing may be selected. If there are no operation engines performing a post-processing, an operation engine in the standby state may be selected. Finally, if none of the above operation engines is available, the current request is rejected.

Figure 5:
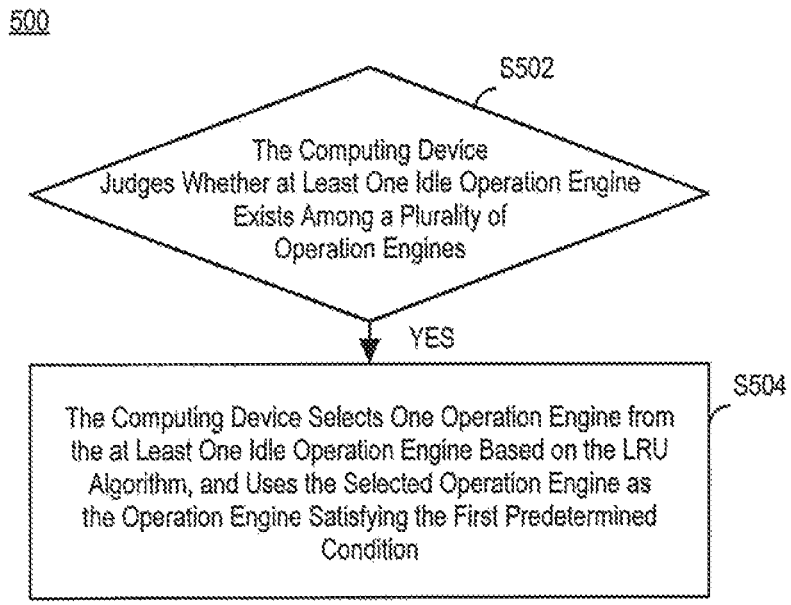
FIG. 5 is a flow chart illustrating an example of a method 500 of implementing step S404 of FIG. 4 in accordance with the present invention.

FIG. 5 shows a flow chart that illustrates an example of a method 500 of implementing step S404 of FIG. 4 in accordance with the present invention. As illustrated in FIG. 5, the method includes the following steps:

Step S502: The computing device determines whether at least one idle operation engine exists among a plurality of operation engines.

Step S504: The computing device selects an operation engine from the at least one idle operation engine based on the LRU algorithm, and uses the selected operation engine as the operation engine satisfying the first predetermined condition if at least one operation engine exists.

Specifically, in the above step, the idle operation engine refers to an operation engine that is idle and may be used to perform the current request task. The LRU algorithm refers to the least recently used algorithm. After one or a plurality of data processing requests are read from the request queue, whether an idle operation engine exists among a plurality of operation engines is determined. If idle operation engines exist among the plurality of operation engines, one or a plurality of operation engines are selected from the plurality of idle operation engines based on the LRU algorithm, and the data processing request is assigned to the operation engine.

In the above embodiment, the data processing request is preferentially assigned to a currently idle operation engine.

In this way, scheduling may be implemented among a plurality of operation engines in the RSA algorithm-based acceleration solution.

Figure 6:
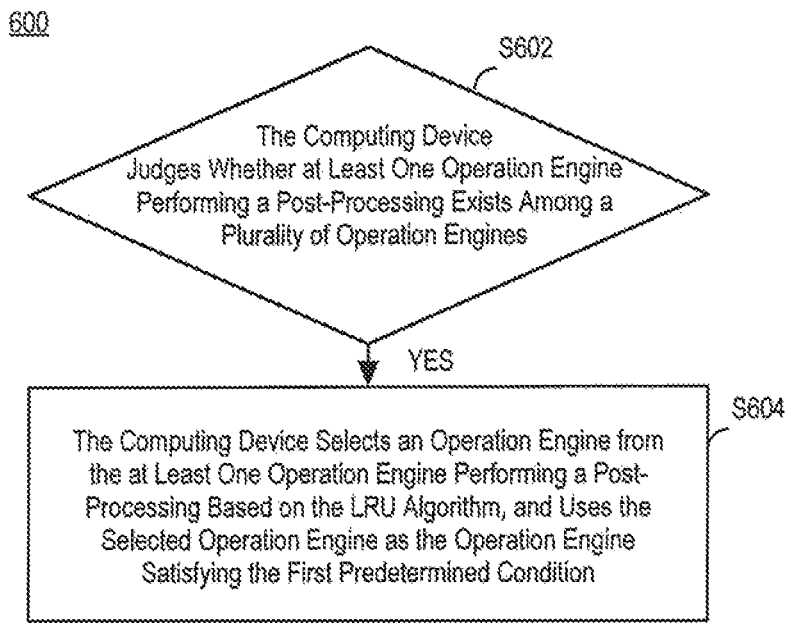
FIG. 6 is a flow chart illustrating an example of a method 600 of implementing step S404 of FIG. 4 in accordance with the present invention.

FIG. 6 shows a flow chart that illustrates an example of a method 600 of implementing step S404 of FIG. 4 in accordance with the present invention. As illustrated in FIG. 6, the method includes the following steps:

Step S602: The computing device determines whether at least one operation engine performing a post-processing exists among a plurality of operation engines.

Step S604: The computing device selects an operation engine from the at least one operation engine performing a post-processing based on the LRU algorithm, and uses the selected operation engine as the operation engine satisfying the first predetermined condition if at least one operation engine performing a post-processing exists.

Specifically, in the above step, the operation engine performing a post-processing may be an operation engine that is entering the idle state. In one optional implementation solution, after one or a plurality of data processing requests are read from the request queue, whether one or a plurality of idle operation engines exists among a plurality of operation engines may be directly determined. If one or a plurality of operation engines entering the idle state exists, an operation engine is selected form the one or the plurality of idle operation engines based on the LRU algorithm, and the data processing request is assigned to the operation engine. In another optional implementation solution, after one or a plurality of data processing requests are read from a request queue, whether an idle operation engine exists in a plurality of operation engines is first determined. If a plurality of idle operation engines exist in the plurality of operation engines, one or a plurality of operation engines are selected from the plurality of idle operation engines based on the LRU algorithm, and the one or the plurality of data processing requests are assigned to the one or a plurality of operation engines. If no idle operation engine exists in the plurality of operation engines, one operation engine is selected from one or a plurality of operation engines that are entering the idle state based on the LRU algorithm, and the data processing request is assigned to the selected operation engine.

In the above embodiment, the data processing request is preferentially assigned to a currently idle operation engine. If no idle operation engine exists, an operation engine is selected from at least one operation engine performing a post-processing as the operation engine satisfying the first predetermined condition. In this way, resources are sufficiently scheduled and the operation engine resources are fully utilized.

Figure 7:
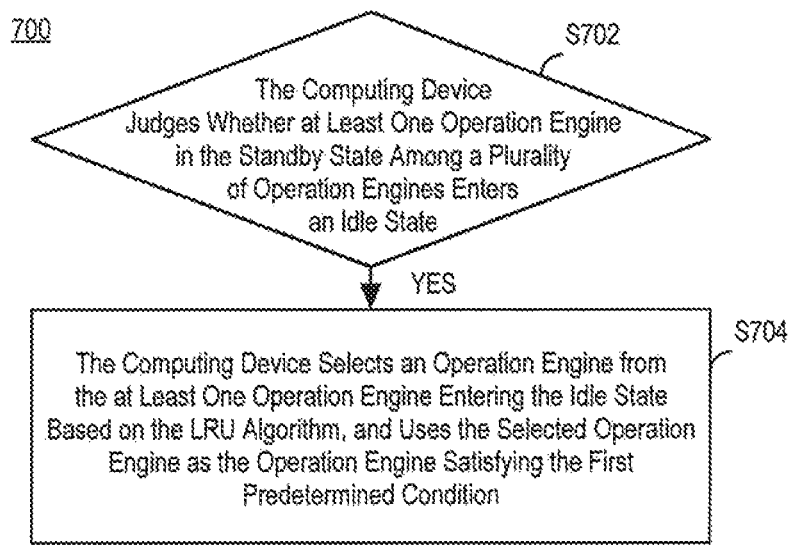
FIG. 7 is a flow chart illustrating an example of a method 700 of implementing step S404 of FIG. 4 in accordance with the present invention.

FIG. 7 shows a flow chart that illustrates an example of a method 700 of implementing step S404 of FIG. 4 in accordance with the present invention. As illustrated in FIG. 7, the method includes the following steps:

Step S702: The computing device judges whether at least one operation engine in the standby state among a plurality of operation engines enters an idle state.

Step S704: The computing device selects an operation engine from the at least one operation engine entering the idle state based on the LRU algorithm as the operation engine satisfying the first predetermined condition if at least one operation engine entering the idle state exists.

Specifically, in the above step, the operation engine in the standby state refers to an operation engine that is current in a performing state and joins a waiting queue. If neither idle operation engines nor operation engines that are performing a post-processing exist in the plurality of operation engines, an idle operation engine may be selected from an operation engine queue in the standby state, and the data processing request may be assigned to the operation engine.

In an optional implementation solution, after one or a plurality of data processing requests are read from a request queue, whether an idle operation engine exists in an operation queue in the standby state among a plurality of operation engines may be directly determined. If at least one idle operation engine exists in the operation engine queue, an operation engine is selected from the one or the plurality of idle operation engines in the operation engine queue based on the LRU algorithm, and the data processing request is assigned to the selected operation engine.

In another optional implementation solution, after one or a plurality of data processing requests are read from a request queue, whether an idle operation engine exists in a plurality of operation engines is first determined. If a plurality of idle operation engines exist in the plurality of operation engines, one or a plurality of operation engines are selected from the plurality of idle operation engines based on the LRU algorithm, and the one or a plurality of data processing requests are assigned to the one or the plurality of operation engines. If no idle operation engine exists in the plurality of operation engines, an operation engine is selected from one or a plurality of operation engines that are entering the idle state based on the LRU algorithm, and the data processing request is assigned to the selected operation engine. If no operation engine that is entering the idle state exists in the plurality of operation engines, an idle operation engine is selected from an operation engine queue, and the data processing request is assigned to the operation engine.

According to the above embodiments, in a scenario where neither idle operation engines nor operation engines that are performing a post-processing exist in a plurality of operation engines, an idle operation engine is selected from an operation engine queue, and the data processing request is assigned to the selected operation engine. This further improves scheduling and utilization rate of the operation engine resources.

Figure 8:
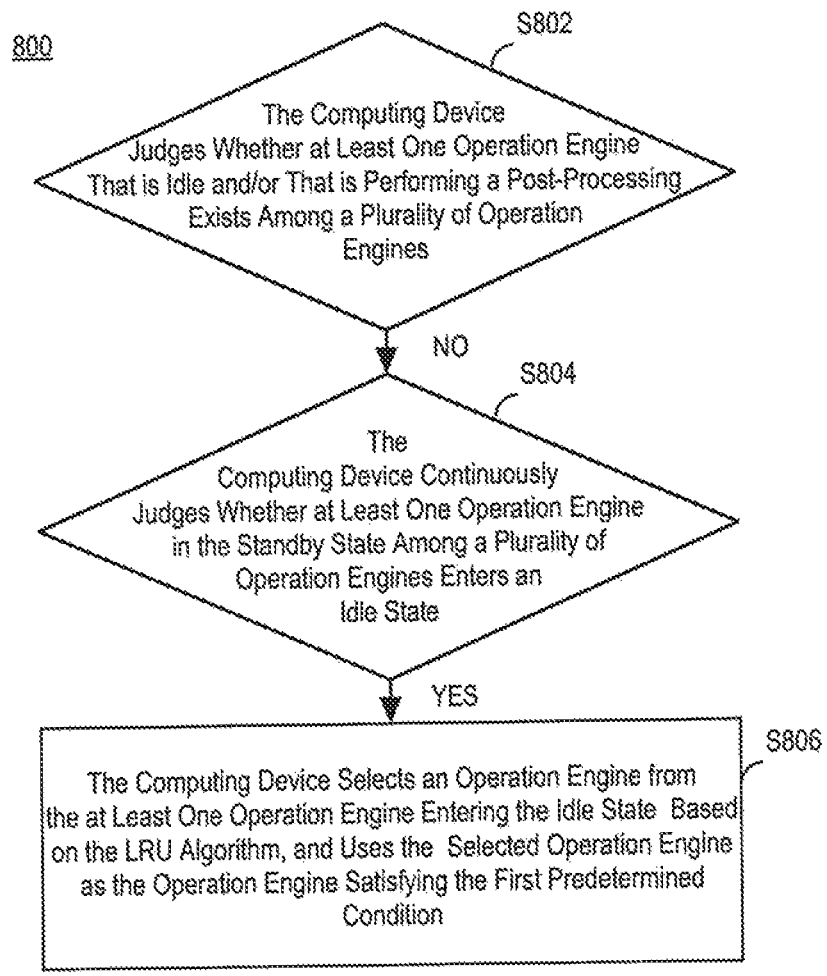
FIG. 8 is a flow chart illustrating an example of a method 800 of implementing step S404 of FIG. 4 in accordance with the present invention.

FIG. 8 shows a flow chart that illustrates an example of a method 800 of implementing step S404 of FIG. 4 in accordance with the present invention. As illustrated in FIG. 8, the method includes the following steps:

Step S802: The computing device judges whether at least one idle operation engine and/or one operation engine performing a post-processing exists among a plurality of operation engines.

Step S804: The computing device continuously judge whether the operation engine in the standby state among the plurality of operation engines enters an idle state if no idle operation engine and/or operation engine performing a post-processing exists.

Step S806: The computing device selects an operation engine from the at least one operation engine entering the idle state based on the LRU algorithm as the operation engine satisfying the first predetermined condition if at least one operation engine entering the idle state exists.

Specifically, in the above step, after one or a plurality of data processing requests are read from the request queue, whether at least one idle operation engine that and/or one operation engine performing a post-processing exists among a plurality of operation engines is first determined. If at least one operation engine that is idle and/or performing a post-processing exists among the plurality of operation engines, one or a plurality of operation engines are selected from a plurality of operation engines that are idle and/or performing a post-processing based on the LRU algorithm, and the one or a plurality of data processing requests are assigned to the one or the plurality of operation engines. If no engine that is in the idle state or performing a post-processing is found, whether at least one operation engine among the plurality of operation engines in the standby state enters the idle state is continuously determined. If at least one operation engine entering the idle state exists, an operation engine is selected from the at least one operation engine entering the idle state based on the LRU algorithm, and the data processing request is assigned to the selected operation engine.

In the above embodiment, in the RSA algorithm-based hardware acceleration solution, resources are sufficiently scheduled and the running operation engine is utilized.

Figure 9:
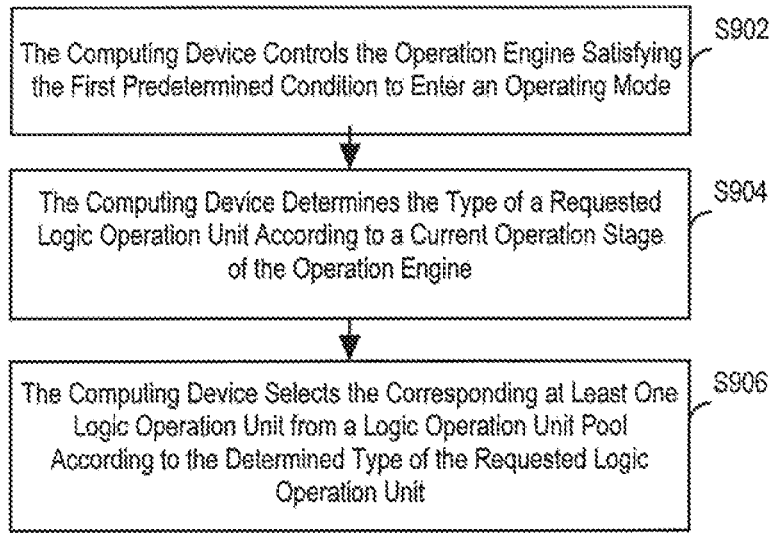
FIG. 9 is a flow chart illustrating an example of a method 900 of implementing step S406 of FIG. 4 in accordance with the present invention.

FIG. 9 shows a flow chart that illustrates an example of a method 900 of implementing step S406 of FIG. 4 in accordance with the present invention. As illustrated in FIG. 9, the method includes the following steps:

Step S902: The computing device controls the operation engine satisfying the first predetermined condition to enter an operating mode.

Step S904: The computing device determines the type of a requested logic operation unit according to a current operation stage of the operation engine.

Step S906: The computing device selects the corresponding at least one logic operation unit from the logic operation unit pool according to the determined type of the requested logic operation unit.

Specifically, in the above step, the logic operation units may be operation units involved in the process when the operation engine processes the data processing request. In an embodiment, using the RSA algorithm as an example, the logic operation units may be algorithm logic units. One or a plurality of data processing requests are read from the request queue. At least one operation engine satisfying the predetermined condition is selected from a plurality of operation engines by using the first-stage scheduling algorithm. The data processing request is assigned to the selected operation engine, and then the operation engine enters the operating mode. The type of a logic operation unit that is requested is determined according to the current state at the current operation stage. After the type of the logic operation unit that is requested is determined, at least one corresponding logic operation unit is selected from the logic operation unit pool according to the determined type of the logic operation unit.

In an embodiment, the selecting at least one corresponding logic operation unit from the logic operation unit pool includes: requesting a logic operation unit of the determined type from the logic operation unit pool in a polling manner, and occupying the requested logic operation unit.

It should be noted herein that since the operation time of the same type of ALUs is completely the same each time, what needs to be determined is merely whether an idle ALU of this type exists in the ALU pool. If idle ALUs exist, the ALUs may be assigned in a polling manner. Therefore, the basic scheduling function of the second-stage scheduler is implemented by a ring-shaped shifter in one-hot encoding and a logic operation of an idle mark, and resources are allocated by means of request control.

In an embodiment, using the RSA algorithm as an example, FIG. 3(a) is an RSA hardware acceleration solution based on a single engine according to an embodiment of the present invention, while FIG. 3(b) is an RSA hardware acceleration solution based on multiple engines according to an embodiment of the present invention. As illustrated in FIG. 3(a), single-engine RSA hardware accelerator 300 includes configuration register 310, data I/O interface 312, RSA engine 314, and three respective types of ALUs, ALU0, ALU1, and ALU2. As illustrated in FIG. 3(b), multiple-engines RSA hardware accelerator 330 includes configuration register 332, data I/O interface 334, N RSA operation engines 336, and three respective types of ALUs, ALU0, ALU1, and ALU2.

It should be noted that ALU0 is configured to perform pre-processing/post-processing steps, and ALU1 and ALU2 are configured to perform formal calculation steps. ALU1 is configured to perform squaring and modulus acquisition steps, while ALU2 is configured to perform multiply and modulus acquisition steps. Since ALU0, ALU1, and ALU2 have different data bit widths, ALU0, ALU1, and ALU2 are generally not multiplexed. The squaring and modulus acquisition steps of ALU1 may also be replaced by the multiply and modulus acquisition steps of ALU2. However, ALU1 is dedicated, optimized, and designed to perform the squaring and modulus acquisition steps. As a result, the power consumption and speed are better than those of ALU2. After the selected operation engine performing the current task enters the operating mode, the corresponding ALU resources are sequentially requested from the second-stage scheduler of the RSA hardware accelerator according to states at different operation stages of the operation engine. For example, at a pre-calculation stage, an ALU0 resource may be requested; and at a formal calculation stage, an ALU1 or ALU2 resource may be requested.

Figure 10:
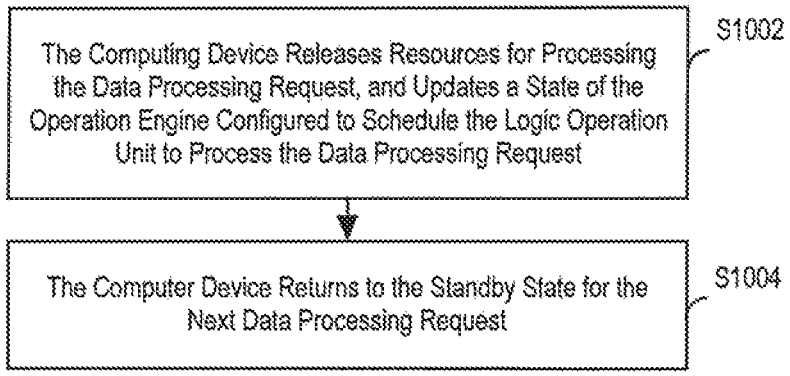
FIG. 10 is a flow chart illustrating an example of a method 1000 that follows step S408 of FIG. 4 in accordance with the present invention.

FIG. 10 shows a flow chart that illustrates an example of a method 1000 that follows step S408 of FIG. 4 in accordance with the present invention. As illustrated in FIG. 10, the method includes the following steps:

Step S1002: The computing device releases resources for processing the data processing request, and updates a state of the operation engine configured to schedule the logic operation unit to process the data processing request.

Step S1004: The computing device returns to the standby state for the next data processing request.

Specifically, in the above step, when the operation engine completes the algorithm iteration step and outputs a result, the resource once occupied by the operation engine is released. In the first-stage scheduler, the state of the operation engine is updated, a waiting queue and an LRU entry are refreshed, and then the process waits for the next RSA calculation request.

In an embodiment, prior to the assigning, by the computing device, each data processing request to an operation engine satisfying a first predetermined condition, the method may further include: if the computing device fails to find an operation engine satisfying the first predetermined condition from the plurality of operation engines, rejecting the data processing request. Following this, the computing device returns to the standby state for the next data processing request.

Figure 11:
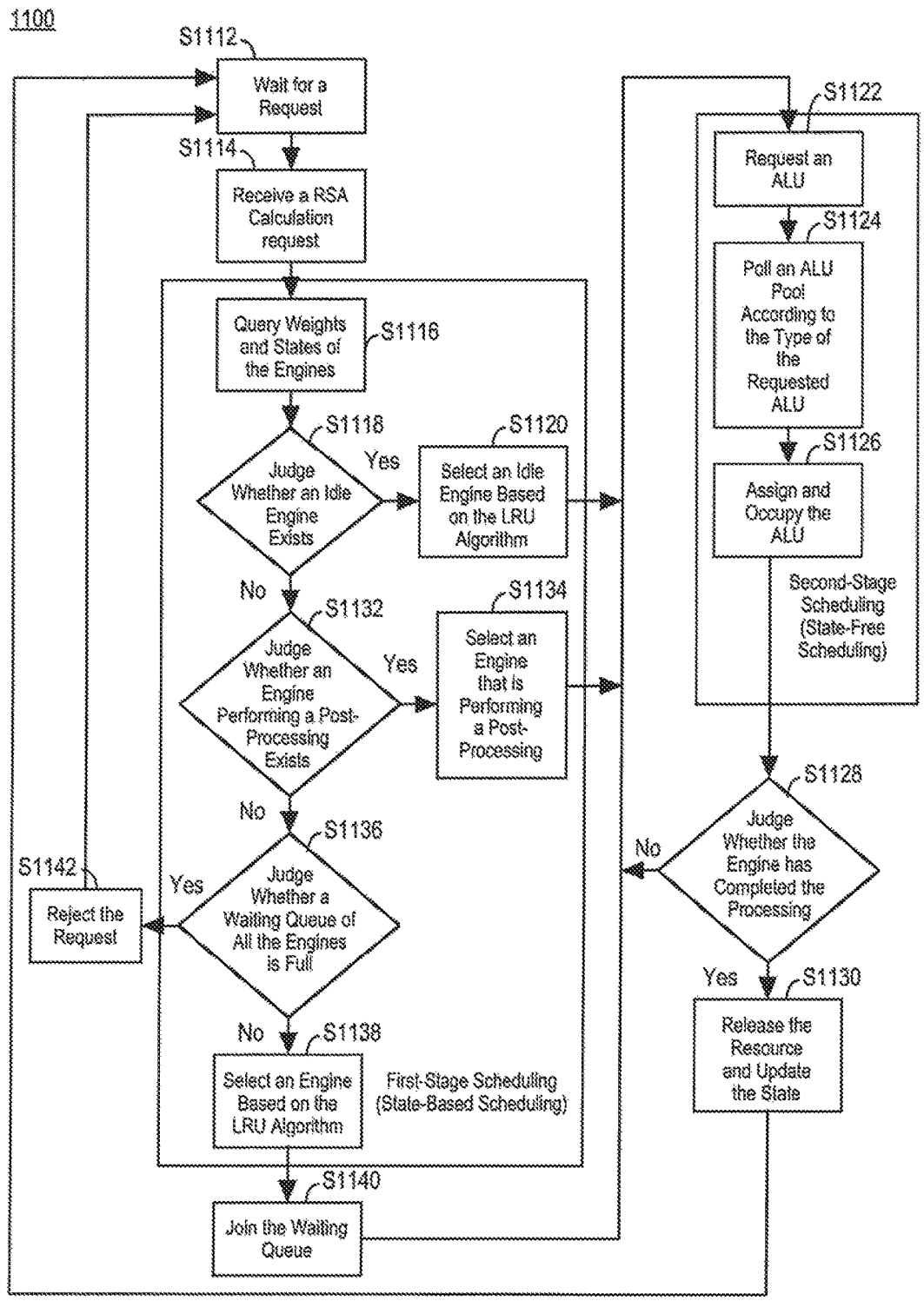
FIG. 11 is a flow chart illustrating an example of a method 1100 of resource scheduling in accordance with the present invention.

FIG. 11 shows a flow chart that illustrates an example of a method 1100 of resource scheduling in accordance with the present invention. As illustrated in FIG. 11, the method includes the following steps:

Step S1112: Waiting for a request.

Specifically, in the above step, the request is a data processing request, and a plurality of operation engines in an operation engine queue are in the standby state that correspond to the data processing requests.

Step S1114: An RSA calculation request is received.

Specifically, in the above step, a data processing request of the RSA algorithm is received via a data I/O interface.

Step S1116: Weights and states of the engines are queried.

Specifically, in the above step, after the data processing requests of the RSA algorithm has been received via the data I/O interface, the weights and current states of the operation engines are queried in the operation engine queue. The states include: an idle state, a post-processing state (that is, a state that is the operation engine is entering the idle state), and a state of allowing waiting.

Step S1118: Whether an idle engine exists is determined.

Specifically, in the above step, whether an idle operation engine exists is determined. If an idle operation engine exists, step S1120 is performed. If no idle operation engine exists, step S1132 is performed.

Step S1120: An idle engine is selected based on the LRU algorithm.

Specifically, in the above step, if a plurality of idle operation engines exist, one or a plurality of operation engines are selected from the plurality of idle operation engines based on the LRU algorithm, and the data processing request is assigned to the selected operation engine.

Step S1122: An ALU is requested.

Specifically, in the above step, after one or a plurality of operation engines are selected from the plurality of idle operation engines based on the LRU algorithm, and the data processing request is assigned to the selected operation engine, the operation engine enters an operating mode. The type of the requested logic operation unit is determined according to the state of the current operation stage. After the type of the requested logic operation unit is determined, the logic operation unit of the corresponding type is requested from the second-stage scheduler according to the determined type of the requested logic operation unit.

Step S1124: An ALU pool is polled according to the type of the requested ALU

Specifically, in the above step, after the type of the requested logic operation unit is determined, at least one corresponding logic operation unit is selected from the logic operation pool in a polling manner according to the determined type of the requested logic operation unit.

Step S1126: An ALU is assigned and occupied.

Specifically, in the above step, after the at least one corresponding logic operation unit is selected from the logic operation pool in the polling manner according to the determined type of the requested logic operation unit, the requested logic operation unit is occupied.

Step S1128: Whether the engine has completed the processing is determined.

Specifically, in the above step, after the at least one corresponding logic operation unit is selected from the logic operation pool in the polling manner, and the requested logic operation unit is occupied, the data processing request is processed by using the logic operation unit, and whether the operation engine completes the processing is determined in real time.

Step S1130: The resource is released and the state is updated.

Specifically, in the above step, after the operation engine processes the data processing request by using the logic operation unit, the resource for processing the data processing request is released, the state of the operation engine configured to schedule the logic operation unit to process the data processing request is updated, and the operation engine returns to the standby state for next data processing request.

Step S1132: Whether an engine performing a post-processing exists is determined.

Specifically, in the above step, after the data processing request of the RSA algorithm is received via the data I/O interface, if no idle operation engine exists among the plurality of operation engines, whether an operation engine performing a post-processing exists among the plurality of operation engines is determined.

Step S1134: An engine performing a post-processing is selected.

Specifically, if an operation engine performing post-processing exists among the plurality of operation engines, an operation engine may be selected based on the LRU algorithm from one or a plurality of operation engines that are performing a post-processing, and the data processing request is assigned to the selected operation engine.

Step S1136: Whether a waiting queue of all the engines is full.

Specifically, in the above step, whether the operation engine queue in the standby state is full is determined. If the operation engine queue in the standby state is not full, step S1138 is performed. If the operation engine queue in the standby state is full, step S1142 is performed.

Step S1138: An engine is selected based on the LRU algorithm.

Specifically, in the above step, if the operation engine queue in the standby state is not full, an engine is selected based on the LRU algorithm and then joins the operation engine waiting queue.

Step S1140: The engine joins the waiting queue.

Specifically, in the above step, an engine is selected based on the LRU algorithm and then joins the operation engine waiting queue, and step S1132 is performed when the operation engines in the waiting queue enter the idle state.

Step S1142: The request is rejected.

Specifically, in the above step, if the operation engine queue in the standby state is full, the data processing request is rejected.

In the above embodiment of the present application, two-stage scheduling algorithms are employed. The first-stage scheduling algorithm performs state-based scheduling for the acceleration engines, and the second-stage scheduling algorithm performs state-free scheduling for the ALUs. Both the hardware implementation complexity of the scheduling algorithm and scheduling effect are taken into consideration in this scheduling solution. Decoupling is achieved among the engines and the logic operation units, such that the utilization rate of the resource is improved. In addition, more balanced hardware resource scheduling also improves resistance to side channel attacks. In the above embodiment, a multi-stage scheduling solution is employed, and the RSA engine state control is decoupled from the ALU pool, and thus the overall design complexity is lowered. The engine is decoupled from the ALU. The engine initiates an ALU occupy request according to the current state thereof. State-based scheduling is performed for the engine set, and load balancing is ensured. State-free scheduling is performed for the ALU pool, and the process is simple and highly efficient.

It should be noted that with respect to the above described method embodiments, for brevity of description, the actions or steps are all described as a series of action combinations. However, a person skilled in the art shall understand that the embodiments of the present invention are not subjected to limitations of the action sequences described above. Further, based on the embodiments of the present invention, some steps may be performed in another or other sequences or may be simultaneously performed. In addition, a person skilled in the art should also know that the embodiments described in the description herein are all preferred embodiments, and all the involved actions and modules are not mandatory ones of the embodiments of the present invention.

Through the above description of the method embodiments, it is clear to persons skilled in the art that the methods according to the above embodiment may be accomplished by software plus necessary universal hardware platforms, and definitely may also be accomplished by hardware, but in many cases, the software implementation is preferred. Based on such understanding, portions of the technical solutions of the present invention that essentially contribute to the prior art may be embodied in the form of a software product, the computer software product may be stored in a storage medium, such as a ROM/RAM, a magnetic disk, a CD-ROM and the like, including several instructions for causing a terminal device (which may be a mobile phone, a personal computer, a server, a network device or the like) to perform the methods according to various embodiments of the present invention.

Figure 12:
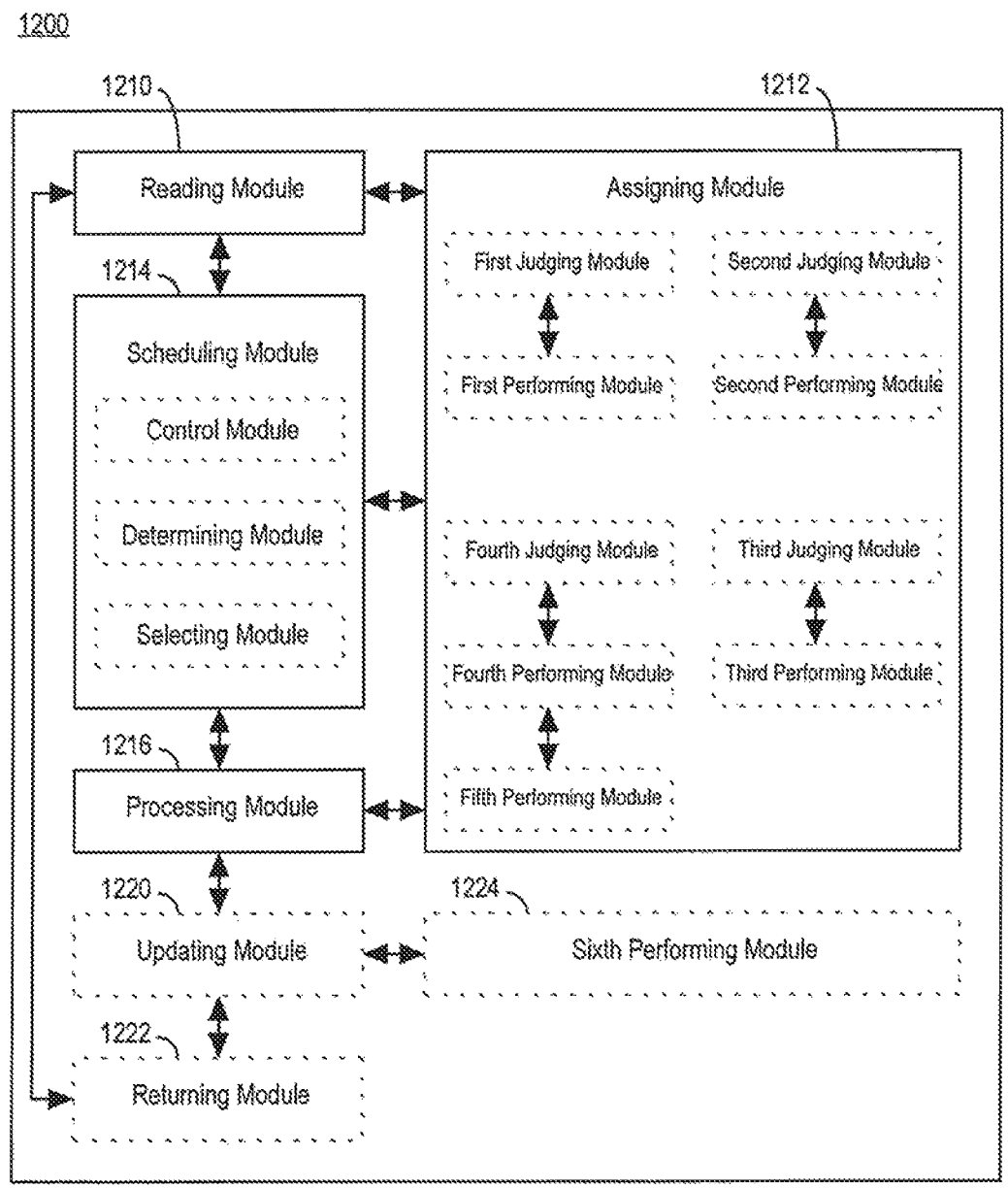
FIG. 12 is a block diagram illustrating an example of a scheduling apparatus 1200 in accordance with the present invention.

FIG. 12 shows a block diagram that illustrates an example of a scheduling apparatus 1200 in accordance with the present invention. As illustrated in FIG. 12, scheduling apparatus 1200 includes a reading module 1210, an assigning module 1212, a scheduling module 1214, and a processing module 1216.

Reading module 1210 is configured to be used by a computing device to read at least one data processing request from a request queue.

Assigning module 1212 is configured to be used by the computing device to assign each data processing request to an operation engine satisfying a first predetermined condition.

Scheduling module 1214 is configured to perform scheduling in a logic operation unit pool based on state data of the operation engine satisfying the first predetermined condition to obtain at least one logic operation unit satisfying a second predetermined condition.

Processing module 1216 is configured to be used by the computing device to process the data processing request by using the at least one logic operation unit satisfying the second predetermined condition.

It should be noted herein that reading module 1210, assigning module 1212, scheduling module 1214, and processing module 1216 may correspond to step S402 to step S408 in FIG. 4. The four modules and their corresponding steps practice the same examples and are applied in the same scenario, which are, however, not limited to the content of the disclosed embodiments.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, using the RSA algorithm as an example, each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine exists, a reject response is made. The second-stage scheduling requests corresponding ALU resources according to different operation needs for each RSA engine at different operation stages (pre-calculation, formal calculation and post-processing and the like), and the second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, according to the above embodiment of the present invention, the technical problem that the low utilization rate of operation resources in the computing device is solved.

In an embodiment, the first predetermined condition at least includes one of the following conditions: whether the operation engine is idle, and whether the operation engine is performing post-processing or the operation engine is in a standby state, wherein if the first predetermined condition includes a plurality of conditions, judgment is sequentially made to the operation engine according to a priority sequence of the conditions.

In an embodiment, assigning module 1212 may include: a first judging module, configured to judge by the computing device whether at least one idle operation engine exists among a plurality of operation engines; and a first performing module, configured to select an operation engine from the at least one idle operation engine based on the LRU algorithm, and use the selected operation engine as the operation engine satisfying the first predetermined condition if at least one idle operation engine exists.

It should be noted herein that the first judging module and the first performing module correspond to step S502 to step S504 in FIG. 5, and the two modules and their corresponding steps practice the same examples and are applied in the same scenario, which are, however, are not limited to the content of the embodiments illustrated in FIGS. 1 and 2.

In an embodiment, assigning module 1212 may include: a second judging module, configured to judge by the computing device whether at least one operation engine performing a post-processing exists among a plurality of operation engines; and a second performing module, configured to be used by the computing device to select an operation engine from the at least one idle operation engine based on the LRU algorithm, and use the selected operation engine as the operation engine satisfying the first predetermined condition if at least one idle operation engine exists.

It should be noted herein that the second judging module and the second performing module correspond to step S602 to step S604 in FIG. 6, and the two modules and their corresponding steps practice the same examples and are applied in the same scenario, which are, however, not limited to the content of the embodiments illustrated in FIGS. 1 and 2.

In an embodiment, assigning module 1212 may include: a third judging module, configured to be used by the computing device to judge whether at least one operation engine in the standby state among a plurality of operation engines enters an idle state; and a third performing module, configured to be used by the computing device to select an operation engine from the at least one operation engine entering the idle state based on the LRU algorithm as the operation engine satisfying the first predetermined condition if at least one operation engine entering the idle state exists.

It should be noted herein that the third judging module and the third performing module correspond to step S702 to step S704 in FIG. 7, and the two modules and their corresponding steps practice the same examples and are applied in the same scenario, which are, however, not limited to the content of the embodiments illustrated in FIGS. 1 and 2.

In an embodiment, assigning module 1212 may include: a fourth judging module, configured to be used by the computing device to judge whether at least one operation engine that is idle and/or performing a post-processing exists among a plurality of operation engines; a fourth performing module, configured to be used by the computing device to continuously judge whether at least one operation engine in the standby state among the plurality of operation engines enters an idle state if no operation engine that is idle and/or performing a post-processing exists; and a fifth performing module, configured to be used by the computing device to select an operation engine from the at least one operation engine entering the idle state based on the LRU algorithm as the operation engine satisfying the first predetermined condition if at least one operation engine entering the idle state exists.

It should be noted herein that the fourth judging module, the fourth performing module, and the fifth performing module correspond to step S802 to step S806 in FIG. 8, and the three modules and their corresponding steps practice the same examples and are applied in the same scenario, which are, however, not limited to the content of the embodiments illustrated in FIGS. 1 and 2.

In an embodiment, scheduling module 1214 may include: a control module, configured to be used by the computing device to control the operation engine satisfying the first predetermined condition to enter an operating mode; a determining module, configured to be used by the computing device to determine the type of a requested logic operation unit according to a current operation stage of the operation engine; and a selecting module, configured to be used by the computing device to select the corresponding at least one logic operation unit from the logic operation unit pool according to the determined type of the requested logic operation unit.

It should be noted herein that the control module, the determining module, and the selecting module correspond to step S902 to step S906 in FIG. 9, and the three modules and their corresponding steps practice the same examples and are applied in the same scenario, which are, however, not limited to the content of the embodiments illustrated in FIGS. 1 and 2.

In an embodiment, the selecting module may be configured to request by the computing device a logic operation unit of the determined type from the logic operation unit pool in a polling manner, and occupy the requested logic operation unit.

In an embodiment, the apparatus may further include: an updating module 1220, configured to be used by the computing device to release resources for processing the data processing request, and update a state of the operation engine configured to schedule the logic operation unit to process the data processing request; and a returning module 1222, configured to return the computing device to a standby state for the next data processing request.

It should be noted herein that the updating module 1220 and the returning module 1222 correspond to step S1002 to step S1004 in FIG. 10, and the two modules and their corresponding steps practice the same examples and are applied in the same scenario, which are, however, not limited to the content of the embodiments illustrated in FIGS. 1 and 2.

In an embodiment, the apparatus may include: a sixth performing module 1224, configured to: if the computing device fails to find an operation engine satisfying the first predetermined condition from the plurality of operation engines, reject the data processing request, and return to wait for a next data processing request.

It should be noted herein that sixth performing module 1224 corresponds to the steps of rejecting the data processing request, and returning to wait for a next data processing request if the computing device fails to find an operation engine satisfying the first predetermined condition from the plurality of operation engines as illustrated in step S1136 to step S1142 in FIG. 10, and this module and its corresponding step practice the same examples and are applied in the same scenario, which is, however, not limited to the content of the embodiments illustrated in FIGS. 1 and 2.

Figure 13:
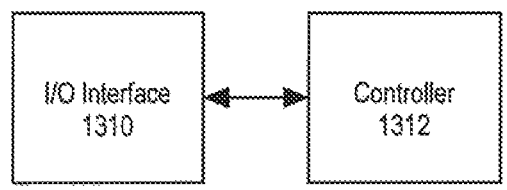
FIG. 13 is a block diagram illustrating an example of a task scheduling apparatus 1300 in accordance with the present invention.

FIG. 13 shows a block diagram that illustrates an example of a task scheduling apparatus 1300 in accordance with the present invention. As illustrated in FIG. 13, the apparatus includes: an input/output interface 1310 and a controller 1312.

Input/output interface 1310 is configured to read at least one data processing request from a request queue. Controller 1312 is connected to input/output interface 1310, and is configured to assign each data processing request to an operation engine satisfying a first predetermined condition, schedule at least one logic unit satisfying a second predetermined condition, and process the data processing request by using the at least one logic unit satisfying the second predetermined condition.

It should be noted herein that input/output interface 1310 may be a parallel transmission interface, or may be a serial transmission interface.

It should be further noted herein that the task scheduling apparatus may be applied in any hardware accelerator for improving the operation speed. In an embodiment, the task scheduling apparatus may also be applied in a hardware encryption unit of an encryption device.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, using the RSA algorithm as an example, each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine exists, a reject response is made. The second-stage scheduling requests corresponding ALU resources according to different operation needs for each RSA engine at different operation stages (pre-calculation, formal calculation and post-processing and the like), and the second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, the above embodiment of the present invention solves the technical problem that the utilization rate of operation resources in the computing device is low.

In an embodiment, the first predetermined condition at least includes one of the following conditions: whether the operation engine is idle, performing a post-processing, or is in a standby state, wherein if the first predetermined condition includes a plurality of conditions, judgment is sequentially made to the operation engine according to a priority sequence of the conditions.

In an embodiment, controller 1312 is configured to judge whether at least one idle operation engine exists among a plurality of operation engines and, if at least one idle operation engine exists, is further configured to select an operation engine from the at least one idle operation engine based on the LRU algorithm, and use the selected operation engine as the operation engine satisfying the first predetermined condition.

In an embodiment, controller 1312 is configured to judge whether at least one operation engine performing a post-processing exists among a plurality of operation engines and, if at least one operation engine performing a post-processing exists, is further configured to select an operation engine from the at least one idle operation engine based on the LRU algorithm, and use the selected operation engine as the operation engine satisfying the first predetermined condition.

In an embodiment, controller 1312 is further configured to judge whether at least one operation engine in the standby state among a plurality of operation engines enters an idle state, and select an operation engine from the at least one operation engine entering the idle state based on the LRU algorithm as the operation engine satisfying the first predetermined condition if at least one operation engine entering the idle state exists.

In an embodiment, controller 1312 is further configured to: judge whether at least one operation engine that is idle and/or performing a post-processing exists among a plurality of operation engines; continuously judge, whether at least one operation engine in the standby state among the plurality of operation engines enters an idle state if no operation engine that is idle and/or performing a post-processing exists; and select an operation engine from the at least one operation engine entering the idle state based on the LRU algorithm as the operation engine satisfying the first predetermined condition if at least one operation engine entering the idle state exists.

In an embodiment, controller 1312 is further configured to: control the operation engine satisfying the first predetermined condition to enter an operating mode; determine the type of a requested logic operation unit according to a current operation stage of the operation engine; and select the corresponding at least one logic operation unit from the logic operation unit pool according to the determined type of the requested logic operation unit.

In an embodiment, controller 1312 is further configured to request a logic operation unit of the determined type from the logic operation unit pool in a polling manner, and occupy the requested logic operation unit.

In an embodiment, controller 1312 is further configured to release resources for processing the data processing request, update a state of the operation engine configured to schedule the logic operation unit to process the data processing request, and return a request for waiting for next data processing.

In an embodiment, controller 1312 is further configured to reject the data processing request and return to wait for a next data processing request if the computing device fails to find an operation engine satisfying the first predetermined condition from the plurality of operation engines.

Figure 14:
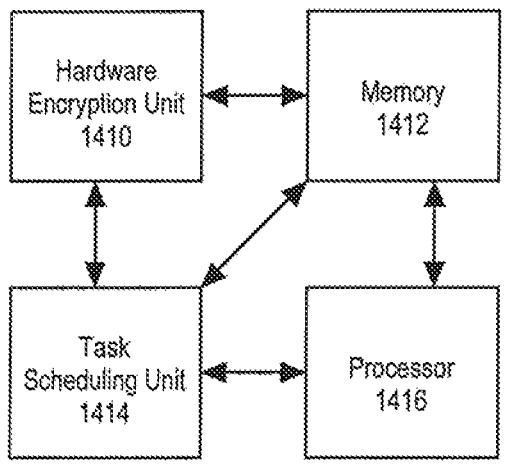
FIG. 14 is a block diagram illustrating an example of a computing device 1400 in accordance with the present invention.

FIG. 14 shows a block diagram that illustrates an example of a computing device 1400 in accordance with the present invention. As illustrated in FIG. 14, computing device 1400 includes a hardware encryption unit 1410, a memory 1412, a task scheduling unit 1414, and a processor 1416.

Hardware encryption unit 1410 is configured to process an encryption request. Memory 1412 is connected to the hardware encryption unit, and is configured to store one or a plurality of data processing requests in the encryption request to a request queue. Task scheduling unit 1414 is connected to memory 1412, and is configured to read at least one data processing request from the request queue, assign the data processing request to an operation engine satisfying a first predetermined condition, and schedule at least one logic operation unit satisfying a second predetermined condition. Processor 1416 is connected to task scheduling unit 1414, and is configured to process the data processing request by using the at least one logic operation unit satisfying the second predetermined condition.

It should be noted herein that computing device 1400 may be a smart mobile device, for example, a mobile phone, a tablet computer, a computer or the like.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, using the RSA algorithm as an example, each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine exists, a reject response is made. The second-stage scheduling requests corresponding ALU resources according to different operation needs for each RSA engine at different operation stages (pre-calculation, formal calculation and post-processing and the like), and the second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, the above embodiment of the present invention solves the technical problem that the utilization rate of operation resources in the computing device is low.

In an embodiment, the first predetermined condition at least includes one of the following conditions: whether the operation engine is idle, and whether the operation engine is performing a post-processing or the operation engine is in a standby state, wherein if the first predetermined condition includes a plurality of conditions, judgment is sequentially made to the operation engine according to a priority sequence of the conditions.

In an embodiment, task scheduling unit 1414 is configured to: judge whether at least one idle operation engine exists among a plurality of operation engines and, if at least one idle operation engine exists, is further configured to select an operation engine from the at least one idle operation engine based on the LRU algorithm, and use the selected operation engine as the operation engine satisfying the first predetermined condition.

In an embodiment, task scheduling unit 1414 is configured to: judge whether at least one operation engine performing a post-processing exists among a plurality of operation engines and, if at least one operation engine performing a post-processing exists, is further configured to select an operation engine from the at least one idle operation engine based on the LRU algorithm, and use the selected operation engine as the operation engine satisfying the first predetermined condition.

In an embodiment, task scheduling unit 1414 is further configured to judge whether at least one operation engine in the standby state among a plurality of operation engines enters an idle state, and select an operation engine from the at least one operation engine entering the idle state based on the LRU algorithm as the operation engine satisfying the first predetermined condition if at least one operation engine entering the idle state exists.

In an embodiment, task scheduling unit 1414 is further configured to: judge whether at least one operation engine that is idle and/or performing a post-processing exists among a plurality of operation engines; continuously judge, whether at least one operation engine in the standby state among the plurality of operation engines enters an idle state if no operation engine that is idle and/or performing a post-processing exists; and select an operation engine from the at least one operation engine entering the idle state based on the LRU algorithm as the operation engine satisfying the first predetermined condition if at least one operation engine entering the idle state exists.

In an embodiment, task scheduling unit 1414 is further configured to: control the operation engine satisfying the first predetermined condition to enter an operating mode; determine the type of a requested logic operation unit according to a current operation stage of the operation engine; and select the corresponding at least one logic operation unit from the logic operation unit pool according to the determined type of the requested logic operation unit.

In an embodiment, task scheduling unit 1414 is further configured to request a logic operation unit of the determined type from the logic operation unit pool in a polling manner, and occupy the requested logic operation unit.

In an embodiment, task scheduling unit 1414 is further configured to release resources for processing the data processing request, and update a state of the operation engine configured to schedule the logic operation unit to process the data processing request, and return a request for waiting for next data processing.

In an embodiment, task scheduling unit 1414 is further configured to: if the computing device fails to find an operation engine satisfying the first predetermined condition from the plurality of operation engines, reject the data processing request, and return to wait for a next data processing request.

An embodiment of the present invention further provides a two-stage scheduling method for use in data processing. It should be noted that the steps illustrated in the flow charts in the accompanying drawings may be performed in, for example, a computer system storing a group of computer-executable instructions, and although a logic sequence is given in the flow charts, under some circumstances, the illustrated or described steps may also be performed in a sequence that is different from the sequence given herein.

Figure 15:
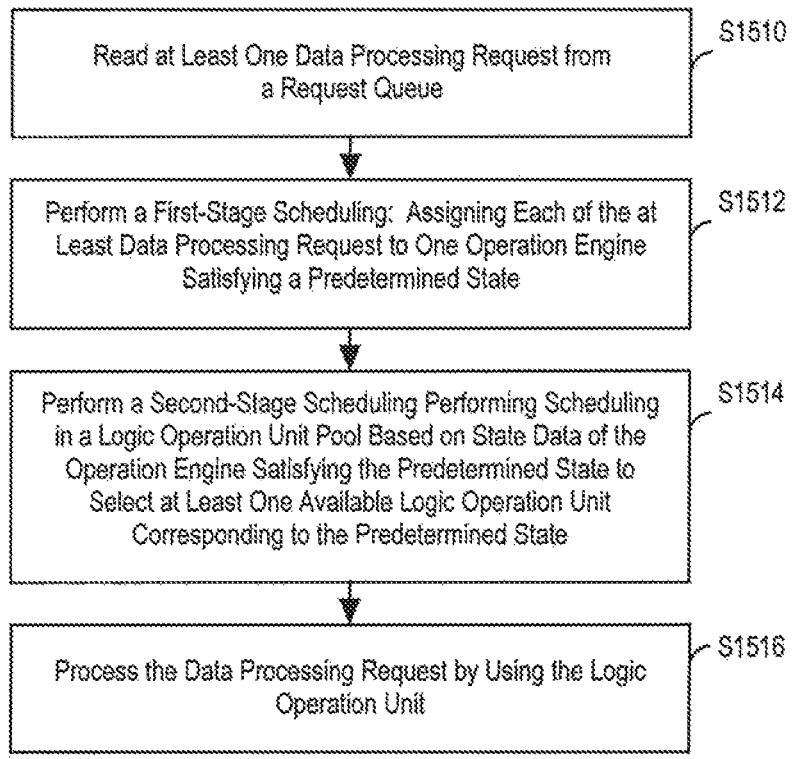
FIG. 15 is a flow chart illustrating an example of a two-stage scheduling method 1500 in accordance with the present invention.

FIG. 15 shows a flow chart that illustrates an example of a two-stage scheduling method 1500 in accordance with the present invention. As illustrated in FIG. 15, the method includes the following steps:

Step S1510: At least one data processing request is read from a request queue.

Step S1512: First-stage scheduling is performed: assigning each of the at least one data processing request to an operation engine satisfying a predetermined condition, wherein the operation engine supports a plurality of performing states in an operation process.

Step S1514: Second-stage scheduling is performed: performing scheduling in a logic operation unit pool based on state data of the operation engine satisfying the predetermined state to select at least one available logic operation unit corresponding to the predetermined state.

Step S1516: The data processing request is processed by using the logic operation unit.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, using the RSA algorithm as an example, each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine exists, a reject response is made. The second-stage scheduling requests corresponding ALU resources according to different operation needs for each RSA engine at different operation stages (pre-calculation, formal calculation and post-processing and the like), and the second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, the above embodiment of the present invention solves the technical problem that the utilization rate of operation resources in the computing device is low.

Figure 16:
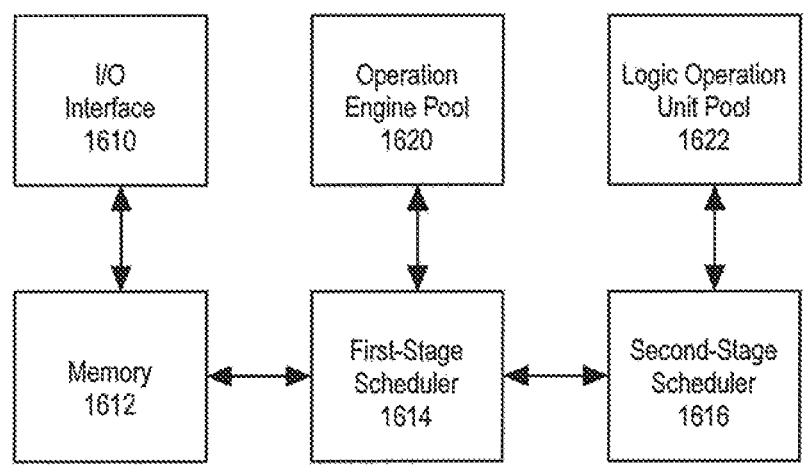
FIG. 16 is a block diagram illustrating an example of a computing device 1600 in accordance with the present invention.

FIG. 16 shows a block diagram that illustrates an example of a computing device 1600 in accordance with the present invention. As illustrated in FIG. 16, the computing device includes: an input and output interface 1610, a memory 1612, a first-stage scheduler 1614, a second-stage scheduler 1616, an operation engine pool 1620, and a logic operation unit pool 1622.

Input and output interface 1610 is configured to receive a data processing request.

Memory 1612 is configured to store the data processing request and form a request queue.

First-stage scheduler 1614 is configured to read at least one data processing request from a request queue, and assign an operation engine satisfying a predetermined state.

Second-stage scheduler 1616 is configured to perform scheduling in a logic operation unit pool based on state data of the operation engine satisfying the predetermined state to select at least one available logic operation unit corresponding to the predetermined state to process the data processing request.

Operation engine pool 1620 includes a plurality of operation engines, and is configured to provide an operation engine for first-stage scheduler 1614, wherein each operation engine supports a plurality of execution states in an operation process.

Logic operation unit pool 1622 includes a plurality of logic operation units, and is configured to provide a logic operation unit for the second-stage scheduler.

It can be known from the above that in the technical solution disclosed in the above embodiment of the present application, two-stage scheduling is employed. State-based scheduling is performed for the operation engines by using the first-stage scheduling, and state-free scheduling is performed for the logic operation units by using the second-stage scheduling. Specifically, after one or a plurality of data processing requests are read from a request task queue, and the data processing request is assigned to an operation engine satisfying a first predetermined condition, the operation engine satisfying the first predetermined condition performs scheduling in a logic operation unit pool to obtain one or a plurality of logic operation units satisfying a second predetermined condition to process the data processing request. In an embodiment, using the RSA algorithm as an example, each input RSA calculation request may enter a uniform parallel request queue, and afterwards resource allocation and calculation are implemented by means of the first-stage scheduling and the second-stage scheduling. The first-stage scheduling achieves task dispatching according to the current state of each RSA engine and the LRU entry, and assigns each request task in the request queue to an RSA engine. If no suitable engine exists, a reject response is made. The second-stage scheduling requests corresponding ALU resources according to different operation needs for each RSA engine at different operation stages (pre-calculation, formal calculation and post-processing and the like), and the second-stage scheduler selects an ALU of a corresponding type from an ALU pool and assigns the selected ALU to the corresponding RSA engine.

According to the solution disclosed in the above embodiment, the RSA engine state control is decoupled from the ALU pool, the overall design complexity is reduced, and the utilization rate of the resources is improved.

In this way, the above embodiment of the present invention solves the technical problem that the utilization rate of operation resources in the computing device is low.

Figure 17:
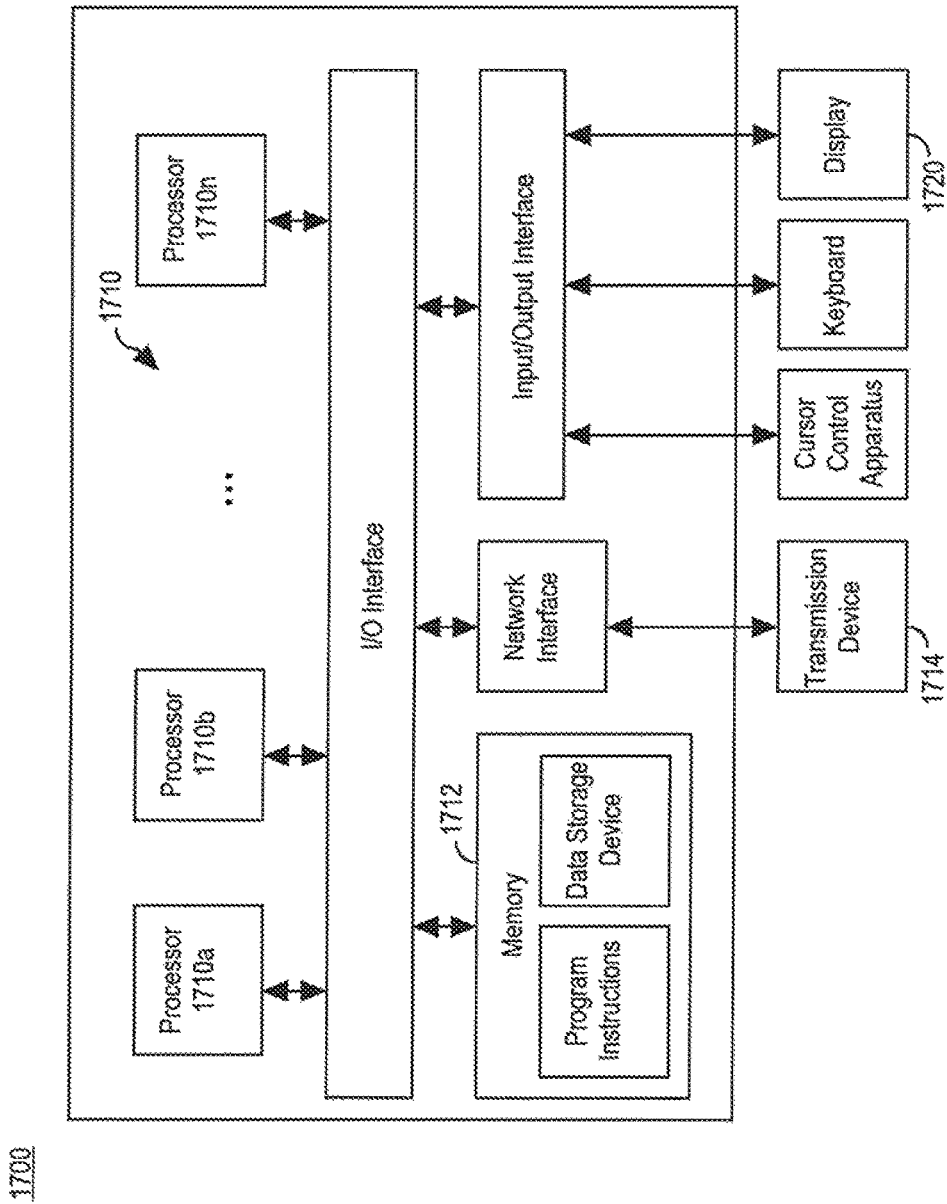
FIG. 17 is a block diagram illustrating an example of a computer terminal 1700 in accordance with the present invention.

FIG. 17 shows a block diagram that illustrates an example of a computer terminal 1700 in accordance with the present invention. As illustrated in FIG. 17, computer terminal 1700 includes: one or a plurality of (marked by 1710a, 1710b, . . . , 1710n in the drawing) processors 1710 (the processors 1710 may include, but not limited to, a microcontroller unit MCU, a field-programmable gate array FPGA or the like processing devices), a memory 1712 for storing data, and a transmission apparatus 1714 for implementing the communication function. In addition, computer terminal 1700 may further include: a display 1720, an input/output interface (I/O interface), a universal serial bus (USB) port (which may be included as a port of the ports of the I/O interface), a network interface, a power supply and/or a camera. Persons of ordinary skill in the art may understand that the structure as illustrated in FIG. 17 is exemplary, which causes no limitation to the structure of the electronic device. For example, computer terminal 1700 may further include more or fewer components over FIG. 17, or have different configurations from FIG. 17.

This embodiment of the present invention may provide a computer terminal. The computer terminal may be any computer terminal device in a group of computer terminals. In this embodiment, the above computer terminal may also be replaced by a terminal device such as a mobile terminal or the like.

In this embodiment, the above computer terminal may be located in at least one network device of a plurality of network devices in a computer network.

It should be noted that the one or a plurality of processors 1710 and/or other data processing circuits are generally referred to as "data processing circuits" in this text. The data processing circuits may be totally or partially embodied as software, hardware, firmware or any combination thereof. In addition, the data processing circuits may be independent or individual processing modules, or may be totally or partially integrated in any one of other elements in computer terminal 1700. As described in the embodiment of the present application, the data processing circuit acts as a controller, for example, to control selection of terminal paths of a variable resistor.

Memory 1712 may be configured to store software programs and modules of applications, for example, the program instructions/data storage devices corresponding to the scheduling methods for use in data processing according to the embodiments of the present invention. Processor 1710 is configured to run the software programs and modules stored in memory 1712, to implement various function applications and data processing, that is, implementing the scheduling methods for use in data processing of the applications. Memory 1712 may include a high-speed random memory, and may further include a non-volatile memory, for example, one or a plurality of magnetic storage devices, flash memories, or other non-volatile solid memories. In some embodiments, memory 1712 may further include memories remotely configured relative to processor 1710. These memories may be connected to computer terminal 1700 over a network. The above examples include, but not limited to, the Internet, Intranet, local area network, mobile communication network and a combination thereof.

Transmission apparatus 1714 is configured to receive or send data over a network. Specific examples of the network may include a wireless network provided by a communication service provider of computer terminal 1700. In an embodiment, transmission apparatus 1714 includes a network interface controller (NIC), which may be connected to other network devices via a base station and hence communicates with the Internet. In an embodiment, transmission apparatus 1714 may be a radio frequency (RF) module, which is configured to communicate with the Internet in a wireless manner.

The display may be, for example, a touch liquid crystal display (LCD). The LCD enables the user to conduct an interaction with a user interface of computer terminal 1700 (or the mobile terminal).

It should be noted herein that in some other embodiments, the computer device (or the mobile device) as illustrated in FIG. 17 may include a hardware element (including the circuit), a software element (including computer code stored on a computer-readable medium) or a combination of the hardware element and the software element. It should be mentioned that FIG. 17 merely illustrates a specific example, which is intended to illustrate the type of the components that may be configured in the computer device (or the mobile device).

In this embodiment, computer terminal 1700 may execute program code to perform the following steps in the scheduling method for use in data processing of the application: reading, by a computing device, at least one data processing request from a request queue; assigning, by the computing device, each data processing request to an operation engine satisfying a first predetermined condition; performing scheduling, by the computing device, in a logic operation unit pool based on state data of the operation engine satisfying the first predetermined condition to obtain at least one logic operation unit satisfying a second predetermined condition; and processing, by the computing device, the data processing request by using the at least one logic operation unit satisfying the second predetermined condition.

Memory 1712 may be configured to store software applications and modules, for example, the program instructions/modules corresponding to the security vulnerability detection method and apparatus according to the embodiments of the present invention. Processor 1710 is configured to run the software applications and modules stored in memory 1712, to implement various function applications and data processing; that is, implementing the system vulnerability attack detection method. Memory 1712 may include a high-speed random memory, and may further include a non-volatile memory, for example, one or a plurality of magnetic storage devices, flash memories, or other non-volatile solid memories. In some examples, memory 1712 may further include memories remotely configured relative to the processor. These memories may be connected to a terminal over a network. The above examples include, but not limited to, the Internet, Intranet, local area network, mobile communication network and a combination thereof.

Via the transmission apparatus, processor 1710 may call information and applications stored in memory 1712 to perform the following steps: reading, by a computing device, at least one data processing request from a request queue; assigning, by the computing device, each data processing request to an operation engine satisfying a first predetermined condition; performing scheduling, by the computing device, in a logic operation unit pool based on state data of the operation engine satisfying the first predetermined condition to obtain at least one logic operation unit satisfying a second predetermined condition; and processing, by the computing device, the data processing request by using the at least one logic operation unit satisfying the second predetermined condition.

In this embodiment, the predetermined operating state at least includes one of the following conditions: whether the operation engine is idle, performing post-processing, or the operation engine is in a standby state, wherein if the predetermined operating state includes a plurality of conditions, judgment is sequentially made to the operation engine according to a priority sequence of the conditions.

In this embodiment, processor 1710 may also execute program code to perform the following steps: judging, by the computing device, whether at least one idle operation engine exists among a plurality of operation engines; selecting, by the computing device, an operation engine from the at least one idle operation engine based on the LRU algorithm; and using the selected operation engine as the operation engine satisfying the first predetermined condition if at least one idle operation engine exists.

In this embodiment, processor 1710 may also execute program code to perform the following steps: judging, by the computing device, whether at least one operation engine performing a post-processing exists among a plurality of operation engines; selecting, by the computing device, an operation engine from the at least one operation engine performing a post-processing based on the LRU algorithm; and using the selected operation engine as the operation engine satisfying the first predetermined condition if at least one operation engine performing a post-processing exists.

In this embodiment, processor 1710 may also execute program code to perform the following steps: judging, by the computing device, whether at least one operation engine in the standby state among a plurality of operation engines enters an idle state; and selecting, by the computing device, an operation engine from the at least one operation engine entering the idle state based on the LRU algorithm as the operation engine satisfying the first predetermined condition if at least one operation engine entering the idle state exists.

In this embodiment, processor 1710 may also execute program code to perform the following steps: judging, by the computing device, whether at least one operation engine that is idle and/or performing a post-processing exists among a plurality of operation engines; continuously judging, by the computing device, whether at least one operation engine in the standby state among the plurality of operation engines enters an idle state if no operation engine that is idle and/or performing a post-processing exists; and selecting, by the computing device, an operation engine from the at least one operation engine entering the idle state based on the LRU algorithm as the operation engine satisfying the first predetermined condition if at least one operation engine entering the idle state exists.

In this embodiment, processor 1710 may also execute program code to perform the following steps: controlling, by the computing device, the operation engine satisfying the first predetermined condition to enter an operating mode; determining, by the computing device, the type of a requested logic operation unit according to a current operation stage of the operation engine; and selecting, by the computing device, the corresponding at least one logic operation unit from the logic operation unit pool according to the determined type of the requested logic operation unit.

In this embodiment, processor 1710 may also execute program code to perform the following step: requesting, by the computing device, a logic operation unit of the determined type from the logic operation unit pool in a polling manner, and occupying the requested logic operation unit.

In this embodiment, processor 1710 may also execute program code to perform the following steps: releasing, by the computing device, resources for processing the data processing request; updating a state of the operation engine configured to schedule the logic operation unit to process the data processing request; and returning, by the computing device, a request for waiting for next data processing.

In an embodiment, processor 1710 may also execute program code to perform the following step: if the computing device fails to find an operation engine satisfying the first predetermined condition from the plurality of operation engines, rejecting the data processing request, and returning to wait for a next data processing request.

Persons of ordinary skill in the art may understand that the structure as illustrated in FIG. 17 is exemplary, computer terminal 1700 may also be a smart phone (for example, an Android mobile phone, an iOS mobile phone or the like), a tablet computer, a palm computer, a mobile Internet device (MID), a PAD or the like terminal device. FIG. 17 causes no limitation to the structure of the electronic device. For example, computer terminal 1700 may further include more or fewer components (for example, a network interface, a display device or the like) over FIG. 17, or have different configurations from FIG. 17.

Persons of ordinary skill in the art may understand that all or a part of the steps in the methods according to the above embodiments may be performed by the related hardware of a terminal device which is instructed by a program. The program may be stored in a computer-readable storage medium. The storage medium may include: a flash memory disk, a read-only memory (ROM), a random access memory (RAM), a magnetic disc or an optical disc or the like.

An embodiment of the present invention further provides a storage medium. In this embodiment, the storage medium may be configured to store program code that is executed to perform the scheduling method for use in data processing as disclosed in the embodiments illustrated in FIGS. 4-11.

In this embodiment, the storage medium may be located in any one computer terminal in a computer terminal group in a computer network, or may be located in any mobile terminal in a mobile terminal group.

In this embodiment, the storage medium is configured to store program code to perform the following steps: reading, by a computing device, at least one data processing request from a request queue; assigning, by the computing device, each data processing request to an operation engine satisfying a first predetermined condition; performing scheduling, by the computing device, in a logic operation unit pool based on state data of the operation engine satisfying the first predetermined condition to obtain at least one logic operation unit satisfying a second predetermined condition; and processing, by the computing device, the data processing request by using the at least one logic operation unit satisfying the second predetermined condition.

In this embodiment, the first predetermined condition at least includes one of the following conditions: whether the operation engine is idle, performing a post-processing or the operation engine is in a standby state, wherein if the first predetermined condition includes a plurality of conditions, judgment is sequentially made to the operation engine according to a priority sequence of the conditions.

In this embodiment, the storage medium is configured to store program code to perform the following steps: judging, by the computing device, whether at least one idle operation engine exists among a plurality of operation engines; selecting, by the computing device, one operation engine from the at least one idle operation engine based on the LRU algorithm; and using the selected operation engine as the operation engine satisfying the first predetermined condition if at least one idle operation engine exists.

In this embodiment, the storage medium is configured to store program code to perform the following steps: judging, by the computing device, whether at least one operation engine performing a post-processing exists among a plurality of operation engines; selecting, by the computing device, an operation engine from the at least one operation engine performing a post-processing based on the LRU algorithm; and using the selected operation engine as the operation engine satisfying the first predetermined condition if at least one operation engine performing a post-processing exists.

In this embodiment, the storage medium is configured to store program code to perform the following steps: judging, by the computing device, whether at least one operation engine in the standby state among a plurality of operation engines enters an idle state; and selecting, by the computing device, an operation engine from the at least one operation engine entering the idle state based on the LRU algorithm as the operation engine satisfying the first predetermined condition if at least one operation engine entering the idle state exists.

In this embodiment, the storage medium is configured to store program code to perform the following steps: judging, by the computing device, whether at least one operation engine that is idle and/or performing a post-processing exists among a plurality of operation engines; continuously judging, by the computing device, whether at least one operation engine in the standby state among the plurality of operation engines enters an idle state if no operation engine that is idle and/or performing a post-processing exists; and selecting, by the computing device, an operation engine from the at least one operation engine entering the idle state based on the LRU algorithm as the operation engine satisfying the first predetermined condition if at least one operation engine entering the idle state exists.

In this embodiment, the storage medium is configured to store program code to perform the following steps: controlling, by the computing device, the operation engine satisfying the first predetermined condition to enter an operating mode; determining, by the computing device, the type of a requested logic operation unit according to a current operation stage of the operation engine; and selecting, by the computing device, the corresponding at least one logic operation unit from the logic operation unit pool according to the determined type of the requested logic operation unit.

In this embodiment, the storage medium is configured to store program code to perform the following step: requesting, by the computing device, a logic operation unit of the determined type from the logic operation unit pool in a polling manner, and occupying the requested logic operation unit.

In this embodiment, the storage medium is configured to store program code to perform the following steps: releasing, by the computing device, resources for processing the data processing request; updating a state of the operation engine configured to schedule the logic operation unit to process the data processing request; and returning, by the computing device, a request for waiting for next data processing.

In this embodiment, the storage medium is configured to store program code to perform the following step: if the computing device fails to find an operation engine satisfying the first predetermined condition from the plurality of operation engines, rejecting the data processing request, and returning to wait for a next data processing request.

The sequence numbers of the embodiments of the present invention are only for ease of description, but do not denote the preference of the embodiments.

In the above embodiments of the present invention, descriptions give different particular emphases to various embodiments, and the portion of some embodiment that is not described may be referenced to the relevant description in other embodiments.

In the several embodiments provided in the present invention, it should be understood that the disclosed technical contents may be practiced in other manners. The above described device embodiments are merely illustrative. For example, the unit division is merely logical function division and may be other divisions in actual practice. For example, multiple units or components may be combined or integrated into another system, or some features can be ignored or not performed. In addition, the displayed or discussed mutual couplings or direct couplings or communication connections may be implemented through some interfaces. The indirect couplings or communication connections between the units or modules may be implemented in electronic, mechanical or other forms.

The units which are described as separate components may be physically separated or may be not physically separated, and the components which are illustrated as units may be or may not be physical units, that is, the components may be located in the same position or may be distributed into a plurality of network units. Some of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated units above may be implemented in a form of hardware or in a form of a software functional unit.

If the integrated units are implemented in a form of a software functional unit and sold or used as an independent product, the units may be stored in a computer readable storage medium. Based on such an understanding, the technical solutions of the present application essentially, or the part contributing to the related art, or all or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present invention. The storage medium includes various media capable of storing program code, for example, a USB flash disk, a removable hard disk, a read-only memory (ROM), a random access memory (RAM), a magnetic disk, or an optical disc.

Described above are preferred examples of the present invention. It should be noted that persons of ordinary skill in the art may derive other improvements or polishments without departing from the principles of the present invention. Such improvements and polishments shall be deemed as falling within the protection scope of the present invention.

The above descriptions are merely preferred embodiments of the present invention. It should be pointed out that those of ordinary skill in the art can make several improvements and modifications without departing from the principle of the present invention, and the improvements and modifications should also be construed as falling within the protection scope of the present invention.

What is claimed is:

1. A method of scheduling data processing requests, the method comprising:

reading, by a computing device, a data processing request from a request queue;
identifying, by the computing device, one or more idle operation engines within a plurality of operation engines in response to reading the data processing request;
selecting, by the computing device, an idle operation engine from the plurality of operation engines as a selected operation engine to process the data processing request when an idle operation engine is identified;
determining, by the computing device, a type of logic operation unit required by the selected operation engine to process the data processing request;
identifying, by the computing device, one or more available logic operation units within a plurality of logic operation units that match the type of logic operation unit required by the selected operation engine to process the data processing request;
selecting, by the computing device, a logic operation unit that matches the type of logic operation unit required by the selected operation engine as a selected logic operation unit when a logic operation unit that matches the type of logic operation unit required by the selected operation engine is identified; and
assigning, by the computing device, the selected logic operation unit to the selected operation engine to execute the data processing request.

2. The method according to claim 1, wherein the selected operation engine is selected from a plurality of idle operation engines based on a least recently used (LRU) algorithm.

3. The method according to claim 1, further comprising:
identifying one or more operation engines in the plurality of operation engines that are performing post processing when no idle operation engines are present in the plurality of operation engines; and
selecting, by the computing device, a post-processing operation engine from the plurality of operation engines as the selected operation engine to process the data processing request when a post-processing operation engine is identified.

4. The method according to claim 3, wherein the post-processing operation engine selected as the selected operation engine is selected from a plurality of post-processing operation engines based on a least recently used (LRU) algorithm.

5. The method according to claim 3, further comprising:
identifying one or more idle operation engines in the plurality of operation engines that are in a standby state when no post-processing operation engines are present in the plurality of operation engines; and
selecting, by the computing device, an idle operation engine in a standby state as the selected operation engine to process the data processing request when an idle operation engine in the standby state is identified.

6. The method according to claim 1, wherein a plurality of types of logic operation units are required to process the data processing request.

7. The method according to claim 1, further comprising:
releasing, by the computing device, resources for processing the data processing request, and updating a state of an operation engine configured to schedule a logic operation unit to process the data processing request; and
returning to a standby state for a next data processing.

8. A non-transitory computer-readable medium having computer executable instructions for performing a method for scheduling data processing, the method comprising:
reading a data processing request from a request queue;
identifying one or more idle operation engines within a plurality of operation engines in response to reading the data processing request;
selecting an idle operation engine from the plurality of operation engines as a selected operation engine to process the data processing request when an idle operation engine is identified;
determining a type of logic operation unit required by the selected operation engine to process the data processing request;
identifying one or more available logic operation units within a plurality of logic operation units that match the type of logic operation unit required by the selected operation engine to process the data processing request;
selecting a logic operation unit that matches the type of logic operation unit required by the selected operation engine as a selected logic operation unit when a logic operation unit that matches the type of logic operation unit required by the selected operation engine is identified; and
assigning the selected logic operation unit to the selected operation engine to execute the data processing request.

9. The non-transitory computer-readable medium of claim 8 wherein the selected operation engine is selected from a plurality of idle operation engines based on a least recently used (LRU) algorithm.

10. The non-transitory computer-readable medium of claim 8, wherein the method further comprises:
identifying one or more operation engines in the plurality of operation engines that are performing post processing when no idle operation engines are present in the plurality of operation engines; and
selecting, by the computing device, a post-processing operation engine from the plurality of operation engines as the selected operation engine to process the data processing request when a post-processing operation engine is identified.

11. The non-transitory computer-readable medium of claim 10, wherein the post-processing operation engine selected as the selected operation engine is selected from a plurality of post-processing operation engines based on a least recently used (LRU) algorithm.

12. The non-transitory computer-readable medium of claim 10, wherein the method further comprises:
identifying one or more idle operation engines in the plurality of operation engines that are in a standby state when no post-processing operation engines are present in the plurality of operation engines; and
selecting, by the computing device, an idle operation engine in a standby state as the selected operation engine to process the data processing request when an idle operation engine in the standby state is identified.

13. The non-transitory computer-readable medium of claim 8, wherein a plurality of types of logic operation units are required to process the data processing request.

14. The non-transitory computer-readable medium of claim 8, wherein the method further comprises:
releasing, by the computing device, resources for processing the data processing request, and updating a state of an operation engine configured to schedule a logic operation unit to process the data processing request; and
returning to a standby state for a next data processing.

15. A computing device, comprising:
an operation engine group having a plurality of operation engines;

a logic operation unit pool having a plurality of types of logic operation units;

a memory that stores a data processing request queue; and a processor coupled to the operation engine group, the logic operation unit pool, and the memory to:

read a data processing request from the data processing request queue;

identify one or more idle operation engines within the plurality of operation engines in response to reading the data processing request;

select an idle operation engine from the plurality of operation engines as a selected operation engine to process the data processing request when an idle operation engine is identified;

determine a type of logic operation unit required by the selected operation engine to process the data processing request;

identify one or more available logic operation units within the plurality of types of logic operation units that match the type of logic operation unit required by the selected operation engine to process the data processing request;

select a logic operation unit that matches the type of logic operation unit required by the selected operation engine as a selected logic operation unit when a logic operation unit that matches the type of logic operation unit required by the selected operation engine is identified; and assign the selected logic operation unit to the selected operation engine to execute the data processing request.

16. The computing device of claim 15 wherein the selected operation engine is selected from a plurality of idle operation engines based on a least recently used (LRU) algorithm.

17. The computing device of claim 15, wherein the processor to further:

identify one or more operation engines in the plurality of operation engines that are performing post processing when no idle operation engines are present in the plurality of operation engines; and select, by the computing device, a post-processing operation engine from the plurality of operation engines as the selected operation engine to process the data processing request when a post-processing operation engine is identified.

18. The computing device of claim 17, wherein the post-processing operation engine selected as the selected operation engine is selected from a plurality of post-processing operation engines based on a least recently used (LRU) algorithm.

19. The computing device of claim 17, wherein the processor to further:

identify one or more idle operation engines in the plurality of operation engines that are in a standby state when no post-processing operation engines are present in the plurality of operation engines; and select, by the computing device, an idle operation engine in a standby state as the selected operation engine to process the data processing request when an idle operation engine in the standby state is identified.

20. The computing device of claim 15, wherein a plurality of types of logic operation units are required to process the data processing request.

* * * * *